(12) United States Patent
Cheng et al.

(10) Patent No.: US 10,032,131 B2
(45) Date of Patent: Jul. 24, 2018

(54) DATA SERVICES FOR ENTERPRISES LEVERAGING SEARCH SYSTEM DATA ASSETS

(75) Inventors: Tao Cheng, Redmond, WA (US); Kris Ganjam, Redmond, WA (US); Kaushik Chakrabarti, Redmond, WA (US); Zhimin Chen, Redmond, WA (US); Vivek R. Narasayya, Redmond, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 13/527,601

(22) Filed: Jun. 20, 2012

(65) Prior Publication Data

US 2013/0346464 A1 Dec. 26, 2013

(51) Int. Cl.
  *G06F 13/00* (2006.01)
  *G06Q 10/10* (2012.01)

(52) U.S. Cl.
  CPC .................................. *G06Q 10/10* (2013.01)

(58) Field of Classification Search
  CPC ......... G06F 17/30867; G06F 17/30864; G06F 17/30861; G06Q 10/10
  USPC .......... 709/201, 217–219; 707/706, 709, 710
  See application file for complete search history.

(56) References Cited

U.S. PATENT DOCUMENTS

| | | | |
|---|---|---|---|
| 5,297,039 A | 3/1994 | Kanaegami et al. | |
| 5,418,948 A | 5/1995 | Turtle | |
| 5,469,355 A | 11/1995 | Tsuzuki | |
| 5,717,913 A | 2/1998 | Driscoll | |
| 5,805,911 A | 9/1998 | Miller | |
| 5,926,808 A | 7/1999 | Evans et al. | |
| 6,006,225 A | 12/1999 | Bowman et al. | |

(Continued)

FOREIGN PATENT DOCUMENTS

| CN | 101354707 A | 1/2009 |
|---|---|---|
| CN | 101785000 A | 7/2010 |

(Continued)

OTHER PUBLICATIONS

Cheng, et al., "Entity Synonyms for Structured Web Search," retrieved at <<http://ieeexplore.ieee.org/stamp/stamp.jsp?tp=&arnumber=5963679>>, IEEE Transactions on Knowledge and Data Engineering, Issue 99, Jul. 28, 2011, pp. 1-15.

(Continued)

*Primary Examiner* — Kenneth R Coulter
(74) *Attorney, Agent, or Firm* — Rainier Patents, P.S.

(57) ABSTRACT

A data service system is described herein which processes raw data assets from at least one network-accessible system (such as a search system), to produce processed data assets. Enterprise applications can then leverage the processed data assets to perform various environment-specific tasks. In one implementation, the data service system can generate any of: synonym resources for use by an enterprise application in providing synonyms for specified terms associated with entities; augmentation resources for use by an enterprise application in providing supplemental information for specified seed information; and spelling-correction resources for use by an enterprise application in providing spelling information for specified terms, and so on.

20 Claims, 15 Drawing Sheets

(56) References Cited

U.S. PATENT DOCUMENTS

| | | | |
|---|---|---|---|
| 6,012,055 A | 1/2000 | Campbell et al. | |
| 6,098,034 A | 8/2000 | Razin et al. | |
| 6,128,613 A | 10/2000 | Wong et al. | |
| 6,137,911 A | 10/2000 | Zhilyaev | |
| 6,269,368 B1 | 7/2001 | Diamond | |
| 6,278,967 B1 | 8/2001 | Akers | |
| 6,363,377 B1 | 3/2002 | Kravets et al. | |
| 6,370,527 B1 | 4/2002 | Singhal | |
| 6,377,945 B1 | 4/2002 | Risvik | |
| 6,510,406 B1 | 1/2003 | Marchisio | |
| 6,571,240 B1 | 5/2003 | Ho et al. | |
| 6,675,159 B1 | 1/2004 | Lin et al. | |
| 6,697,818 B2 | 2/2004 | Li et al. | |
| 6,711,577 B1 | 3/2004 | Wong et al. | |
| 6,804,677 B2 | 10/2004 | Shadmon et al. | |
| 6,876,963 B1 | 4/2005 | Miyahira et al. | |
| 7,024,624 B2 | 4/2006 | Hintz | |
| 7,080,068 B2 | 7/2006 | Leitermann | |
| 7,149,746 B2 | 12/2006 | Fagin et al. | |
| 7,254,530 B2 | 8/2007 | Klavans et al. | |
| 7,254,774 B2 | 8/2007 | Cucerzan et al. | |
| 7,293,003 B2 | 11/2007 | Horton | |
| 7,296,011 B2 | 11/2007 | Chaudhuri et al. | |
| 7,330,811 B2 | 2/2008 | Turcato et al. | |
| 7,340,466 B2 | 3/2008 | Odom et al. | |
| 7,346,490 B2 | 3/2008 | Fass et al. | |
| 7,440,941 B1 | 10/2008 | Borkovsky et al. | |
| 7,483,829 B2 | 1/2009 | Murakami et al. | |
| 7,526,425 B2 | 4/2009 | Marchisio et al. | |
| 7,552,112 B2 | 6/2009 | Jhala et al. | |
| 7,617,202 B2 * | 11/2009 | Brill et al. | |
| 7,627,548 B2 | 12/2009 | Riley et al. | |
| 7,634,462 B2 | 12/2009 | Weyand et al. | |
| 7,636,714 B1 | 12/2009 | Lamping et al. | |
| 7,707,047 B2 | 4/2010 | Hasan et al. | |
| 7,778,817 B1 | 8/2010 | Liu et al. | |
| 7,809,548 B2 | 10/2010 | Mihalcea et al. | |
| 7,860,853 B2 | 12/2010 | Ren et al. | |
| 7,877,343 B2 | 1/2011 | Cafarella | |
| 7,890,526 B1 * | 2/2011 | Brewer et al. | 707/767 |
| 7,917,355 B2 | 3/2011 | Wu et al. | |
| 7,958,489 B2 | 6/2011 | Meijer et al. | |
| 7,890,521 B1 | 12/2011 | Grushetskyy et al. | |
| 8,239,751 B1 | 8/2012 | Rochelle et al. | |
| 8,332,333 B2 | 12/2012 | Agrawal | |
| 8,417,713 B1 | 4/2013 | Blair-Goldensohn et al. | |
| 8,429,099 B1 | 4/2013 | Perkowitz et al. | |
| 8,577,907 B1 | 11/2013 | Singhal et al. | |
| 8,954,422 B2 * | 2/2015 | Hasan | G06F 17/30386 707/723 |
| 9,323,811 B2 * | 4/2016 | Hasan | G06F 17/30386 |
| 2001/0042080 A1 | 11/2001 | Ross | |
| 2002/0103793 A1 | 8/2002 | Koller et al. | |
| 2002/0123882 A1 | 9/2002 | Mohammed | |
| 2002/0169755 A1 | 11/2002 | Framroze et al. | |
| 2002/0178005 A1 | 11/2002 | Dusan | |
| 2003/0004716 A1 | 1/2003 | Haigh et al. | |
| 2003/0033288 A1 | 2/2003 | Shanahan et al. | |
| 2003/0120651 A1 | 6/2003 | Bernstein et al. | |
| 2003/0195877 A1 | 10/2003 | Ford et al. | |
| 2004/0254920 A1 * | 12/2004 | Brill et al. | 707/3 |
| 2005/0021324 A1 | 1/2005 | Brants et al. | |
| 2005/0060312 A1 | 3/2005 | Curtiss et al. | |
| 2005/0060337 A1 | 3/2005 | Chou et al. | |
| 2005/0060643 A1 | 3/2005 | Glass et al. | |
| 2005/0080613 A1 | 4/2005 | Colledge et al. | |
| 2005/0086592 A1 | 4/2005 | Polanyi et al. | |
| 2005/0114322 A1 | 5/2005 | Melman | |
| 2005/0149494 A1 | 7/2005 | Lindh et al. | |
| 2005/0216443 A1 | 9/2005 | Morton et al. | |
| 2005/0216444 A1 | 9/2005 | Ritter et al. | |
| 2006/0026128 A1 | 2/2006 | Bier | |
| 2006/0031207 A1 | 2/2006 | Bjarnestam et al. | |
| 2006/0069589 A1 | 3/2006 | Nigam et al. | |
| 2006/0089927 A1 | 4/2006 | Bandyopadhyay et al. | |
| 2006/0136405 A1 | 6/2006 | Ducaltel et al. | |
| 2006/0195421 A1 | 8/2006 | Kilroy | |
| 2006/0206306 A1 | 9/2006 | Cao et al. | |
| 2006/0218136 A1 | 9/2006 | Surakka et al. | |
| 2006/0271353 A1 | 11/2006 | Berkan | |
| 2006/0253427 A1 | 12/2006 | Wu et al. | |
| 2007/0011154 A1 | 1/2007 | Musgrove et al. | |
| 2007/0011183 A1 | 1/2007 | Langseth et al. | |
| 2007/0038663 A1 | 2/2007 | Colando | |
| 2007/0043723 A1 | 2/2007 | Bitan et al. | |
| 2007/0073745 A1 | 3/2007 | Scott et al. | |
| 2007/0094285 A1 | 4/2007 | Agichtein et al. | |
| 2007/0100823 A1 | 5/2007 | Inmon | |
| 2007/0192085 A1 | 8/2007 | Roulland et al. | |
| 2007/0203929 A1 | 8/2007 | Bolivar | |
| 2007/0233656 A1 | 10/2007 | Bunescu et al. | |
| 2007/0239742 A1 | 10/2007 | Saha et al. | |
| 2008/0016040 A1 | 1/2008 | Jones et al. | |
| 2008/0021898 A1 | 1/2008 | Hoglund | |
| 2008/0077570 A1 | 3/2008 | Tang et al. | |
| 2008/0087725 A1 | 4/2008 | Liu | |
| 2008/0091660 A1 | 4/2008 | Jang et al. | |
| 2008/0097941 A1 | 4/2008 | Agarwal | |
| 2008/0109416 A1 | 5/2008 | Williams | |
| 2008/0147618 A1 | 6/2008 | Bauche | |
| 2008/0154873 A1 | 6/2008 | Redlich et al. | |
| 2008/0195601 A1 | 8/2008 | Ntoulas et al. | |
| 2008/0275694 A1 | 11/2008 | Varone | |
| 2008/0275837 A1 | 11/2008 | Lambov | |
| 2009/0044095 A1 | 2/2009 | Berger et al. | |
| 2009/0144609 A1 | 6/2009 | Liang et al. | |
| 2009/0222434 A1 | 9/2009 | Fothergill | |
| 2009/0281970 A1 | 11/2009 | Mika et al. | |
| 2009/0282012 A1 | 11/2009 | Konig et al. | |
| 2009/0319500 A1 | 12/2009 | Agrawal et al. | |
| 2009/0327223 A1 | 12/2009 | Chakrabarti et al. | |
| 2010/0004925 A1 | 1/2010 | Ah-Pine et al. | |
| 2010/0082657 A1 | 4/2010 | Paparizos et al. | |
| 2010/0106677 A1 | 4/2010 | Yu | |
| 2010/0121702 A1 | 5/2010 | Steelberg et al. | |
| 2010/0250598 A1 | 9/2010 | Brauer et al. | |
| 2010/0280821 A1 | 11/2010 | Tiitola | |
| 2010/0293179 A1 | 11/2010 | Chaudhuri et al. | |
| 2010/0313258 A1 | 12/2010 | Chaudhuri et al. | |
| 2011/0029513 A1 | 2/2011 | Morris | |
| 2011/0071965 A1 | 3/2011 | Long et al. | |
| 2011/0106807 A1 | 5/2011 | Srihari et al. | |
| 2011/0125776 A1 | 5/2011 | Roshen et al. | |
| 2011/0196670 A1 | 8/2011 | Dang et al. | |
| 2011/0213796 A1 | 9/2011 | Kiyota et al. | |
| 2011/0225133 A1 | 9/2011 | Manu | |
| 2011/0282856 A1 | 11/2011 | Ganti et al. | |
| 2011/0302179 A1 | 12/2011 | Agrawal | |
| 2011/0307485 A1 | 12/2011 | Udupa et al. | |
| 2012/0011115 A1 | 1/2012 | Madhavan et al. | |
| 2012/0036123 A1 * | 2/2012 | Hasan | G06F 17/30386 707/723 |
| 2012/0117078 A1 | 5/2012 | Morton et al. | |
| 2012/0150838 A1 | 6/2012 | Yin et al. | |
| 2012/0191642 A1 | 7/2012 | George | |
| 2012/0259890 A1 | 10/2012 | Danesuk et al. | |
| 2013/0166573 A1 | 6/2013 | Vaitheeswaran et al. | |
| 2013/0232129 A1 | 9/2013 | Cheng et al. | |
| 2013/0238621 A1 | 9/2013 | Ganjam et al. | |
| 2013/0346421 A1 | 12/2013 | Wang et al. | |
| 2014/0058722 A1 | 2/2014 | Sun et al. | |
| 2016/0012036 A1 | 4/2016 | Sun et al. | |

FOREIGN PATENT DOCUMENTS

| | | |
|---|---|---|
| CN | 102193970 A | 9/2011 |
| CN | 102306144 A | 1/2012 |
| CN | 102609407 | 7/2012 |
| CN | 102609407 A | 7/2012 |
| WO | 97/40452 A1 | 10/1997 |
| WO | 02/29627 A2 | 4/2002 |
| WO | 2006/123918 A1 | 5/2006 |
| WO | 2008141583 A1 | 11/2008 |
| WO | 2013/133985 A1 | 9/2013 |

(56) References Cited

FOREIGN PATENT DOCUMENTS

OTHER PUBLICATIONS

"Microsoft Research TechFest 2012: Projects," retrieved at <<http://research.microsoft.com/en-us/events/techfest2012/projects.aspx>>, retrieved on Apr. 10, 2012, Microsoft Corporation, Redmond, WA, 7 pages.

Cheng, et al., U.S. Appl. No. 61/606,481, "Robust Discovery of Entity Synonyms using Query Logs," filed Mar. 5, 2012, 61 pages.

Ganjam, et al., U.S. Appl. No. 13/413,179, "Entity Augmentation Service from Latent Relational Data," filed Mar. 6, 2012, 54 pages.

Cheng, et al., U.S. Appl. No. 13/487,260, "Robust Discovery of Entity Synonyms Using Query Logs," filed Jun. 4, 2012, 61 pages.

Yakout, et al., "InfoGather: Entity Augmentation and Attribute Discovery by Holistic Matching with Web Tables," Proceedings of the 2012 International Conference on Management of Data, May 2012, pp. 97-108.

"Enterprise Software,", retrieved on Jun. 19, 2012, Wikipedia article, 3 pages.

Mann, et al., "Unsupervised Personal Name Disambiguation," retrieved at <<http://citeseerx.ist.psu.edu/viewdoc/download?doi=10.1.1.10.7097&rep=rep1&type=pdf>>, Proceedings of the Seventh Conference on Natural Language Learning at HLT-NAACL 2003, vol. 4, 2003, 8 pages.

Mihalcea, et al., "Wikify! Linking Documents to Encyclopedic Knowledge," retrieved at <<http://www.cse.unt.edu/-rada/papers/mihalcea.cikm07.pdf>>, Proceedings of the Sixteenth ACM Conference on Conference on Information and Knowledge Management, 2007, 9 pages.

Mihalcea, Rada, "Unsupervised Large-Vocabulary Word Sense Disambiguation with Graph-based Algorithms for Sequence Data Labeling," retrieved at <<http://www.aclweb.org/anthology-new/H/H05/H05-1052.pdf>>, Proceedings of Human Language Technology Conference and Conference on Empirical Methods in Natural Language Processing (HLT/EMNLP), Oct. 2005, pp. 411-418.

Milne, et al., "Learning to Link with Wikipedia," retrieved at <<http://citeseerx.ist.psu.edu/viewdoc/download?doi=10.1.1.148.3617&rep=rep1&type=pdf>>, Proceedings of the 17th ACM Conference on Information and Knowledge Management, 2008, 10 pages.

Nadeau, et al., "Unsupervised Named-Entity Recognition: Generating Gazetteers and Resolving Ambiguity," retrieved at <<http://cogprints.org/5025/1/NRC-48727.pdf>>, Proceedings of 19th Conference of the Canadian Society for Computational Studies of Intelligence, Jun. 7, 2006, pp. 266-277.

Sarmento, et al., "An Approach to Web-scale Named-Entity Disambiguation," accessible at <<http://sigarra.up.pt/feup/publs_pesquisa.show_publ_file?pct_gdoc_id=68610.>>, Proceedings of the 6th International Conference on Machine Learning and Data Mining in Pattern Recognition, 2009, 15 pages.

Wang, et al., "Targeted Disambiguation of Ad-hoc, Homogeneous Sets of Named Entities," retrieved at <<http://acm.org>>, Proceedings of the 21st International Conference on World Wide Web, Apr. 2012, pp. 719-728.

Booth et al., "Query Sentences as Semantic (Sub) Networks", 2009 IEEE International Conference on Semantic Computing, 6 pages.

Smeaton, et al., "Experiments on Incorporating Syntactic Processing of User Queries into a Document Retrieval Strategy," Proceedings of the 11th Annual International ACM SIGIR Conference on Research and Development in Information Retrieval, 1988, pp. 31-51.

Agrawal, "Mining Association Rules Between Sets of Items in Large Databases," Proceedings of the 1993 ACM SIGMOD International Conference on Management of Data, May 1993, 10 pages.

Aho, et al., "Efficient String Matching: An Aid to Bibliographic Search," Communications of the ACM CACM, vol. 18, Issue 6, Jun. 1975, pp. 333-340.

Arasu, et al., "Efficient Exact Set-Similarity Joins," retrieved at <<http://www.vldb.org/conf/2006/p918-arasu.pdf>>, Proceedings of the 32nd International Conference on Very Large Data Bases, Sep. 2006, pp. 918-929.

Kasliwal, et al., "Text Mining in Biomedical Literature," retrieved at <<http://www.cse.iitb.ac.in/~sourabh/seminar/final/seminar_report>>, Department of Computer Science and Engineering, Indian Institute of Technology, Bombay, India, 27 pages.

Bohn, Christian, "Extracting Named Entities and Synonyms from Wikipedia for use in News Search," retrieved at <<http://daim.idi.ntnu.no/masteroppgaver/IME/IDI/2008/4290/masteroppgave.pdf>>, Master of Science in Computer Science, Norwegian University of Science and Technology, Department of Computer and Information Science, Jun. 2008, 95 pages.

Chakrabarti, et al., "An Efficient Filter for Approximate Membership Checking," retrieved at <<http://acm.org>>, Proceedings of the 2008 ACM SIGMOD International Conference on Management of Data, Jun. 2008, pp. 805-817.

Chandel, et al., "Efficient Batch Top-k Search for Dictionary-based Entity Recognition," retrieved at <<http://www.it.iitb.ac.in/~sunita/papers/icde06b.pdf>>, Proceedings of the 22nd International Conference on Data Engineering, IIT Bombay, 10 pages.

Chaudhuri, et al., "A Primitive Operator for Similarity Joins in Data Cleaning," retrieved at <<http://ieeexplore.ieee.org/stamp/stamp.jsp?arnumber=1617373&isnumber=33902>>, Proceedings of the 22nd International Conference on Data Engineering (ICDE 2006), 2006, 12 pages.

Cheng, et al., "EntityRank: Searching Entities Directly and Holistically," retrieved at <<http://www-forward.cs.uiuc.edu/pubs/2007/entityrank-vldb07-cyc-jul07.pdf>>, Proceedings of the 33rd International Conference on Very Large Data Bases, Sep. 2007, 12 pages.

Cohen, et al., "Exploiting Dictionaries in Named Entity Extraction: Combining Semi-Markov Extraction Processes and Data Integration Methods," retrieved on at <<http://www.cs.cmu.edu/~wcohen/postscript/kdd-04-csmm.pdf>>, Proceedings of the Tenth ACM SIGKDD International Conference on Knowledge Discovery and Data mining, Aug. 2004, 10 pages.

Koudas, et al., "Record Linkage: Similarity Measures and Algorithms," retrieved at <<http://disi.unitn.it/~p2p/RelatedWork/Matching/aj_recordLinkage_06.pdf>>, presentation dated Sep. 23, 2006, 130 pages.

Ganti, et al., "Entity Catergorization Over Large Document Collections," retrieved at <<http:// acm.org>>, Proceedings of the 14th ACM SIGKDD International Conference on Knowledge Discovery and Data Mining, Aug. 2008, pp. 274-282.

Gligorov, et al., "Using Google Distance to Weight Approximate Ontology Matches," retrieved at <<http://www.cs.vu.nl/~frankh/postscript/BNAIC07-WWW07.pdf>>, Proceedings of the 16th International Conference on World Wide Web, 2007, 2 pages.

Han, et al., "Data Mining: Concepts and Techniques," retrieved on at <<http://www.ir.iit.edu/~dagr/DataMiningCourse/Spring2001/BookNotes/4lang.pdf>>, slide presentation, Intelligent Database Systems Research Lab, School of Computing Science, Simon Fraser University, Canada, Jun. 17, 2001, 5 pages.

Hu, Wen-Chu, "ApproxSeek: Web Document Search Using Approximate Matching," retrieved at <<http://citeseerx.ist.psu.edu/viewdoc/download;jsessionid=F776964F00B448D5445A84C3528F0E83?doi=10.1.1.44.8602&rep=rep1&type=pdf>>, Proceedings of the Fifth International Conference on Computer Science and Informatics, Sep. 1999, 5 pages.

Manning et al., Foundations of Statistical Natural Language Processing, The MIT Press, 1999.

Michelson et al., "Mining Heterogeneous Transformations for Record Linkage", IIWeb, pp. 68-73, AAAI Press, 2007.

Lafferty et al., "Conditional Random Fields: Probalistic Models for Segmenting and Labeling Sequence Data", Proceedings of the Eighteenth International Conference on Machine Learning, pp. 282-289, 2001.

Lin, Dekang, "Automatic Retrieval and Clustering of Similar Words", Proceedings of the 17th international Conference on Computational Linguistics, vol. 2, pp. 768-774, 1998.

(56) References Cited

OTHER PUBLICATIONS

"Notice of Allowance," dated Apr. 7, 2015, From U.S. Appl. No. 12/235,635, 16 pages.
"Notice of Allowance," dated Jan. 21, 2014, From U.S. Appl. No. 13/487,260, 5 pages.
Hipp, et al., "Algorithms for Association Rule Mining—A General Survey and Comparison", ACM SIGKDD Explorations Newletter vol. 2 Issue 1, Jun. 2000, pp. 58-64.
"Response to Non-Final Office Action dated Jan. 15, 2015," filed Apr. 15, 2015, From U.S. Appl. No. 13/413,179, 23 Pages.
"Supplemental EP Search Report Rule 61," dated Mar. 4, 2015, From European Patent Application No. 13757813.4, 3 pages.
"Non-Final Office Action," dated Apr. 10, 2012, From U.S. Appl. No. 12/465,832, 16 pages.
"Final Office Action," dated Sep. 19, 2012, From U.S. Appl. No. 12/465,832, 18 pages.
"Final Office Action," dated Oct. 7, 2011, From U.S. Appl. No. 12/465,832, 14 pages.
"Non-Final Office Action," dated May 23, 2011, From U.S. Appl. No. 12/465,832, 19 pages.
"Final Office Action," dated Oct. 21, 2013, From U.S. Appl. No. 12/465,832, 20 pages.
"Notice of Allowance and Examiner's Amendment", dated Jun. 6, 2013, From U.S. Appl. No. 12/478,120, 12 pages.
"Final Office Action," dated Feb. 27, 2012, From U.S. Appl. No. 12/478,120, 18 pages.
"Non-Final Office Action," dated Nov. 3, 2011, From U.S. Appl. No. 12/478,120, 9 pages.
"Response to the Nov. 3, 2011 Non-Final Office Action," From U.S. Appl. No. 12/478,120, filed Feb. 3, 2012
Pasquie, et al., Efficient Mining of Association Rules Using Closed Itemset Lattices, 1999 Elsevier Science Ltd., pp. 25-46.
Notice of Allowability dated Aug. 18, 2016 from U.S. Appl. No. 13/531,493, 14 pages.
Notice of Allowability dated Nov. 18, 2016 from U.S. Appl. No. 12/779,964, 20 pages.
Corrected Notice of Allowability dated Dec. 22, 2016 from U.S. Appl. No. 121779,964, 6 pages.
Notice of Allowability dated Dec. 29, 2016 from U.S. Appl. No. 13/531,493, 11 pages.
Notice of Allowability dated Feb. 17, 2017 from U.S. Appl. No. 12/779,964, 6 pages.
Response filed Oct. 4, 2016 to the Non-Final Office Action dated Apr. 4, 2016 from U.S. Appl. No. 14/864,430, 10 pages.
Final Office Action dated Oct. 26, 2016 from U.S. Appl. No. 14/864,430, 33 pages.
Response dated Aug. 29, 2016 to the First Office Action dated Apr. 13, 2016 from Chinese Patent Application No. 201380013249.X, 18 pages.
Second Office Action dated Dec. 1, 2016 from Chinese Patent Application No. 201380013249.X, 7 pages.
Response dated Sep. 3, 2013 to Non-Final Office Action dated Apr. 2, 2013 from U.S. Appl. No. 13/413,179, 15 pages.
Final Office Action dated Dec. 5, 2013 from U.S. Appl. No. 13/413,179, 31 pages.
Response filed Jun. 5, 2014 to Final Office Action dated Dec. 5, 2013 from U.S. Appl. No. 13/413,179, 19 pages.
Notice of Allowance and Examiner Initiated Interview Summary dated Jun. 17, 2015 from U.S. Appl. No. 13/413,179, 16 pages.
Examination Report dated Mar. 11, 2015 from European Patent Application No. 13757813.4, 4 pages.
Response dated Apr. 8, 2015 to the Examination Report dated Mar. 11, 2015 from European Patent Application No. 13757813.4, 17 pages.
Non-Final Office Action dated Sep. 12, 2013 from U.S. Appl. No. 13/531,493, 14 pages.
Applicant Initiated Interview Summary dated Dec. 18, 2013 from U.S. Appl. No. 13/531,493, 3 pages.
Response dated Dec. 23, 2013 to Non-Final Office Action dated Sep. 12, 2013 from U.S. Appl. No. 13/531,493, 14 pages.
Final Office Action dated Feb. 3, 2014 from U.S. Appl. No. 13/531,493, 12 pages.
Response dated Apr. 30, 2014 to Final Office Action dated Feb. 3, 2014 from U.S. Appl. No. 13/531,493, 13 pages.
Applicant Initiated Interview Summary dated May 1, 2014 from U.S. Appl. No. 13/531,493, 3 pages.
Notice of Allowance and Examiner Initiated Interview Summary dated Aug. 20, 2014 from U.S. Appl. No. 13/531,493, 22 pages.
Correction Notice of Allowability dated Feb. 27, 2015 from U.S. Appl. No. 13/531,493, 3 pages.
Notice of Allowance dated Mar. 18, 2015 from U.S. Appl. No. 13/531,493, 9 pages.
Notice of Allowance dated Jul. 2, 2015 from U.S. Appl. No. 13/531,493, 5 pages.
Requirement for Restriction/Election dated Apr. 25, 2014 from U.S. Appl. No. 13/594,473, 6 pages.
Response dated Aug. 25, 2014 to Requirement for Restriction/Election dated Apr. 25, 2014 from U.S. Appl. No. 13/594,473, 10 pages.
Non-Final Office Action dated Sep. 11, 2014 from U.S. Appl. No. 13/594,473, 13 pages.
Amendment and Response dated Dec. 11, 2014 to Non-Final Office Action dated Sep. 11, 2014 from U.S. Appl. No. 13/594,473, 13 pages.
Notice of Allowance and Examiner Initiated Interview dated Jan. 14, 2015 from U.S. Appl. No. 13/594,473, 11 pages.
Amendment and Response dated Apr. 14, 2015 to Notice of Allowance dated Jan. 14, 2015 from U.S. Appl. No. 13/594,473, 10 pages.
Non-Final Office Action dated May 12, 2015 from U.S. Appl. No. 13/594,473, 6 pages.
Amendment and Response dated Aug. 12, 2015 to Non-Final Office Action dated May 12, 2015 from U.S. Appl. No. 13/594,473, 10 pages.
Notice of Allowance dated Aug. 26, 2015 from U.S. Appl. No. 13/594,473, 8 pages.
International Search Report and Written Opinion dated Feb. 13, 2014 from PCT Patent Application No. PCT/US2013/055500, 12 pages.
International Preliminary Report on Patentability and Written Opinion dated Feb. 24, 2015 from PCT Patent Application No. PCT/US2013/055500, 9 pages.
Cohen, et al., "Learning to Match and Cluster Large High-Dimensional Data Sets for Data Integration", In Proceedings of the Eighth ACM SIGKDD International Conference on Knowledge Discovery and Data Mining, Jul. 23-26, 2002, 6 pages.
Sarawagi, Sunita, "Models and Indices for Integrating Unstructured Data with a Relational Database", In Proceedings of the Workshop on Knowledge Discovery in Inductive Databases, Sep. 20, 2004, 10 pages.
Schallehn, et al., "Efficient Similarity-based Operations for Data Integration", In Journal of Data & Knowledge Engineering, vol. 48, Issue 3, Aug. 12, 2003, 27 pages.
Berlin, et al., "TupleRank: Ranking Discovered Content in Virtual Databases", In Proceedings of 6th International Conference on Next Generation Information Technologies and Systems, Jul. 4-6, 2006, 15 pages.
Madhavan, et al., Corpus-based Schema Matching, 21st International Conference on Data Engineering, Apr. 5-8, 2005, 12 pages.
Venetis, et al., "Recovering Semantics of Tables on the Web", Proceedings of the VLDB Endowment, vol. 4, Issue 9, Jun. 2011, 10 pages.
Ganjam, et al., "InfoGather: Entity Augmentation and Attribute Discovery by Holistic Matching with Web Tables", SIGMOD '12, May 20-24, 2012, Scottsdale AZ, 12 pages.
Bahmani, et al., "Fast Personalized Pagerank on Mapreduce", In SIGMOD, Jun. 12-16, 2011, Athens, Greece, 12 pages.
Ghani, et al., "Text Mining for Product Attribute Extraction", SIGKDD Explorations, vol. 8, Issue 1, Jun. 2006, 8 pages.
Bernstein, et al., Generic Schema Matching, Ten Years Later. In VLDB Endowment, vol. 4, No. 11, 2011, 7 pages.
Cafarella, et al., Data Integration for the Relational Web. VLDB, Aug. 24-28, 2009, Lyon, France, 12 pages.

(56) References Cited

OTHER PUBLICATIONS

Cafarella, et al., Webtables: Exploring the Power of Tables on the Web, PVLDB, 2008, 12 pages.
Cafarella, et al., "Uncovering the Relational Web", In WebDB, Jun. 13, 2008, Vancouver, Canada, 6 pages.
Doan, et al., "Reconciling Schemas of Disparate Data Sources: A Machine-Learning Approach", In ACM SIGMOD, May 21-24, 2001, 12 pages.
Elsayed, et al., "Pairwise Document Similarity in Large Collections with Mapreduce", In ACL, Jun. 2008, 4 pages.
Gupta, et al., "Answering Table Augmentation Queries from Unstructured Lists on the Web", Proc. VLDB Endowment, Aug. 24-28, 2009, Lyon France, 12 pages.
He, et al., "Statistical Schema Matching Across Web Query Interfaces", In SIGMOD 2003, Jun. 9-12, 2003, San Diego, CA, 12 pages.
He, et al., "Seisa: Set Expansion by Iterative Similarity Aggregation", In WWW, Mar. 28-Apr. 1, 2011, Hyderabad, India, 10 pages.
Limaye, et al., "Annotating and Searching Web Tables Using Entities, Types and Relationships", VLDB Endowment, vol. 3, No. 1, 2010, 10 pages.
Madhavan, et al., "Generic Schema Matching with Cupid", 27th VLDB Conference, 2001, Roma, Italy, 10 pages.
Page, et al., The Pagerank Citation Ranking: Bringing Order to the Web. Technical Report, Stanford InfoLab, 1998, 17 pages.
Rahm, et al., "A Survey of Approaches to Automatic Schema Matching", The VLDB Journal, 2001, 24 pages.
Yin, et al., "Facto: A Fact Lookup Engine Based on Web Tables", In WWW, Mar. 28-Apr. 1, 2011, Hyderabad, India, 10 pages.
"International Search Report and Written Opinion", dated Jun. 26, 2013, From PCT Patent Application No. PCT/US2013/027203, 10 pages.
Loser et al., "Augmenting Tables by Self-Supervised Web Search," in Enabling Real-Time Business Intelligence, 4th International Workshop, BIRTE 2010, LNBIP 84, pp. 84-99, 2011.
Feldman et al., "Self-supervised Relation Extraction from the Web," F. Esposito et al. (Eds.): ISMIS 2006, LNAI 4203, pp. 755-764, 2006.
Banko et al, "Open Information Extraction from the Web", Commun. ACM 51, 12 (Dec. 2008), pp. 68-74.
Urbanski et al., "Entity Extractions from the Web with WebKnox," V. Snasel et al. (Eds.): Advances in Intelligent Web Mastering—2, AISC 67, pp. 209-218.
"Response to the Feb. 27, 2012 Final Office Action," From U.S. Appl. No. 12/478,120, filed Jun. 27, 2012.
"Preliminary Report on Patentability", From PCT Application No. PCT/US2013/027203 dated Sep. 9, 2014.
First Office Action dated Jun. 22, 2016 from China Patent Application No. 201380044316.4, 9 pages.
"Notice of Allowance," From U.S. Appl. No. 12/235,635, dated Dec. 11, 2014, 16 pages.
"Non-Final Office Action," From U.S. Appl. No. 12/235,635, dated Feb. 16, 2011, 13 pages.
"Response to the Feb. 16, 2011 Non-Final Office Action," From U.S. Appl. No. 12/235,635, filed Jul. 18, 2011, 27 pages.
"Final Office Action," From U.S. Appl. No. 12/235,635, dated Oct. 25, 2011, 16 pages.
"Response to the Oct. 25, 2011 Final Office Action," From U.S. Appl. No. 12/235,635, filed Jan. 27, 2012, 23 pages.
"Advisory Action," From U.S. Appl. No. 12/235,635, dated Feb. 6, 2012, 3 pages.
"Response to the Oct. 25, 2011 Final Office Action," From U.S. Appl. No. 12/235,635, filed Mar. 25, 2012, 29 pages.
"Non-Final Office Action," From U.S. Appl. No. 12/235,635, dated Nov. 18, 2013, 12 pages.
"Response to the Nov. 18, 2013 Non-Final Office Action," From U.S. Appl. No. 12/235,635, filed Feb. 17, 2014, 14 pages.
"Supplemental Amendment," From U.S. Appl. No. 12/235,635, filed Mar. 11, 2014, 10 pages.
"Notice of Allowance," From U.S. Appl. No. 12/235,635, dated May 23, 2014, 16 pages.
"Notice of Allowance," From U.S. Appl. No. 12/235,635, dated Aug. 29, 2014, 16 pages.
"Non-Final Office Action," From U.S. Appl. No. 12/779,964, dated Apr. 29, 2015, 26 pages.
"Response to the May 23, 2011 Non-Final Office Action," From U.S. Appl. No. 12/465,832, filed Aug. 16, 2011, 17 pages.
"Response to the Oct. 7, 2011 Final Office Action," From U.S. Appl. No. 12/465,832, filed Dec. 22, 2011, 17 pages.
"Response to the Sep. 19, 2012 Final Office Action," From U.S. Appl. No. 12/465,832, filed Dec. 18, 2012, 19 pages.
"Response to the Jun. 13, 2013 Non-Final Office Action," From U.S. Appl. No. 12/465,832, filed Jul. 30, 2013, 26 pages.
"Non-Final Office Action," From U.S. Appl. No. 12/465,832, dated Jun. 13, 2013.
"Response to the Nov. 3, 2011 Non-Final Office Action," From U.S. Appl. No. 12/478,120, filed Feb. 3, 2012, 15 pages.
"Non-Final Office Action," From U.S. Appl. No. 13/487,260, dated Mar. 7, 2013, 10 pages.
"Response to the Mar. 7, 2013 Non-Final Office Action," From U.S. Appl. No. 13/487,260, filed Aug. 6, 2013, 15 pages.
Notice of Allowance, dated Oct. 17, 2013 From U.S. Appl. No. 13/487,260, 11 pages.
Zhai, et al., ""A Study of Smoothing Methods for Language Models Applied to Ad Hoc Information Retrieval,"" Proceedings of the 24th Annual International ACM SIGIR Conference on Research and Development in InformationRetrieval, 2001, accessible at <<http://ciir.cs.umass.edu/irchallenges/smooth.pdf>>, 9 pages.
Graupmann, ""Concept-Based Search on Semi-Structured Data Exploiting Mined Semantic Relations,"" EDBT2004 Workshops, LNCS 3268, Eds. W. Lindner et al., Springer-Verlag, Berlin Heidelberg, 2004, accessible at <<http://www.springerlink.com/content/p7fw8dk70v2x8w4a/fulltext.pdf>>, pp. 34-43.
Cohen, et al., ""XSEarch: A Semantic Search Engine for XML,"" Proceedings of the 29th VLDB Conference, Berlin, Germany, 2003, accessible at <<http://www.vldb.org/conf/2003/papers/S03P02.pdf>>, 12 pages.
Chklovski, et al., "VERBOCEAN: Mining the Web for Fine-Grained Semantic Verb Relations," Proceedings of EMNLP 2004, 2004, accessible at <<http://acl.ldc.upenn.edu/acl2004/emnlp/pdf/Chklovski.pdf>>, 8 pages.
Chang, et al., ""Structured Databases on the Web: Observations and Implications,"" ACM SIGMOD Record archive, vol. 33, Issue 3, 2004, accessible at <<http://eagle.cs.uiuc.edu/pubs/2004/dwsurvey-sigmodrecord-chlpz-aug04.pdf>>, 10 pages.
Craswell, et al., ""Random Walks on the Click Graph,"" Proceedings of the 30th Annual International ACM SIGIRConference on Research and Development in Information Retrieval, 2007, accessible at <<http://research.microsoft.com/users/nickcr/pubs/craswell_sigir07.pdf>>, 8 pages.
Fuxman, et al., ""Using the Wisdom of the Crowds for Keyword Generation,"" Proceeding of the 17th InternationalConference on World Wide Web, 2008, accessible at <<http://delivery.acm.org/10.1145/1370000/1367506/p61fuxman.pdf?key1=1367506 &key2=7612479121&coll=&dl=ACM&CFID=592564 &CFTOKEN=87519440>>, pp. 61-70.
Malekian, et al., ""Optimizing Query Rewrites for Keyword-Based Advertising,"" ACM Conference on ElectronicCommerce (EC), Chicago, Illinois, Jul. 8-12, 2008, accessible at <<http://delivery.acm.org/10.1145/1390000/1386793/p10-malekian.pdf?key1=1386793&key2=8852479121&coll=ACM&dl=ACM &CFID=593354&CFTOKEN=82835948>>,pp. 10-19.
Miller, George A., ""Wordnet: A Lexical Database for English,"" Communications of the ACM, vol. 38, No. 11, Nov. 1995, accessible at <<http://delivery.acm.org/10.1145/220000/219748/p39-miller.pdf?key1=219748&key2=0502389121&coll=GUIDE &dl=GUIDE&CFID=604516&CFTOKEN=66566361>>, pp. 39-41.
Strube, et al., ""Wikirelate! Computing Semantic Relatedness Using Wikipedia,"" AAAI Press, 2006, accessible at<<http://www.dit.unitn.it/~p2p/RelatedWork/Matching/aaai06.pdf>>, 6 pages.

(56) References Cited

OTHER PUBLICATIONS

Turney, Peter D., ""Mining the Web for Synonyms: PMI-IR versus LSA on TOEFL,"" Lecture Notes in ComputerScience, 2167, 2001, accessible at <<http://cogprints.org/1796/1/ECML2001.ps>>, 12 pages.
Wen, et al., ""Clustering User Queries of a Search Engine,"" Proceedings of the 10th International Conference on WorldWide Web, 2001, accessible <<http://research.microsoft.com/users/jrwen/jrwen_files/publications/QC-WWW10.pdf>>,pp. 162-168.
Baeza-Yates, et al., "Extracting Semantic Relations from Query Logs," retrieved at <<http://acm.org>>, Proceedings of the 13th ACM SIGKDD International Conference on Knowledge Discovery and Data Mining, Aug. 12-15, 2007, pp. 76-85.
"PageRank," retrieved at <<http://en.wikipedia.org/wiki/PageRank>>, Wikipedia article, retrieved on Sep. 11, 2008, 5 pages.
Arasu, et al., "PageRank Computation and the Structure of the Web: Experiments and Algorithms," retrieved at <<http://www2002.org/CDROM/poster/173.pdf>>, Proceedings of the Eleventh International World Wide Web Conference, 2002, 5 pages.
Bhattacharya, et al., "Collective Entity Resolution in Relational Data," retrieved at <<http://linqs.cs.umd.edu/basilic/web/Publications/2007 /bhattacharya:tkdd07 /bhattacharya-tkdd.pdf>>, ACM Transactions on Knowledge Discovery from Data, vol. 1, No. 1, 2007, 35 pages.
Brin, et al., "The Anatomy of a Large-Scale Hypertextual Web Search Engine," retrieved at <<http://www.cs.panam.edu/~creilly/courses/CSCI6175-F11/papers/Brin-1998.pdf>>, Proceedings of the Seventh International Conference on World Wide Web 7, 1998, 20 pages.
Bunescu, et al., "Using Encyclopedic Knowledge for Named Entity Disambiguation," retrieved at <<http://www.cs.utexas.edu/-ml/papers/encyc-eacl-06.pdf>>, Proceeding of the 11th Conference of the European Chapter of the Association of Computational Linguistics, 2006, 8 pages.
Chakaravarthy, et al., "Efficiently Linking Text Documents with Relevant Structured Information," retrieved at <<http://www.vldb.org/conf/2006/p667-chakaravarthy.pdf>>, VLDB '06, Proceedings of the 32nd International Conference on Very Large Data Bases, 2006, pp. 667-678.
Watanabe, et al., "A Graph-based Approach to Named Entity Categorization in Wikipedia Using Conditional Random Fields," retrieved at <<http://www.aclweb.org/anthology-new/D/D07/D07-1068.pdf>>, Proceedings of the 2007 Joint Conference on Empirical Methods in Natural Language Processing and Computational Natural Language Learning, Jun. 2007, pp. 649-657.
Cucerzan, Silviu, "Large-Scale Named Entity Disambiguation Based on Wikipedia Data," retrieved at <<http://acl.ldc.upenn.edu/D/D07/D07-1074.pdf>>, Proceedings of the 2007 Joint Conference on Empirical Methods in Natural Language Processing and Computational Natural Language, 2007, pp. 708-716.
Dill, et al., "SemTag and Seeker: Bootstrapping the Semantic Web Via Automated Semantic Annotation," retrieved at <<http://what.csc.villanova.edu/-cassel/901 OSemanticWeb/SemTag%20and%20Seeker%20Bootstrapping%20the%20semantic%20web%20via%20automated%20semantic%20annotation.pdf>>, Proceedings of the 12th International Conference on World Wide Web, 2003, 9 pages.
Gale, et al., "One Sense Per Discourse," retrieved at <<http://citeseerx.ist.psu.edu/viewdoc/download;jsessionid=8EA215CDO7B134CA243A22FF6DDA2871?doi=10.1.1.178.2723&rep=rep1 &type=pdf>>, Proceedings of the Workshop on Speech and Natural Language, 1992, pp. 233-237.
Gentile, et al., "Graph-based Semantic Relatedness for Named Entity Disambiguation," retrieved at <<http://staffwww.dcs.shef.ac.uk/people/J.Iria/iria_s3t09.pdf>>, Proceedings of the 1st International Conference on Software, Services and Semantic Technologies (S3T), Oct. 2009, 8 pages.
Gooi, et al., "Cross-Document Coreference on a Large Scale Corpus," retrieved at <<http://acl.ldc.upenn.edu/hlt-naacl2004/main/pdf/177 _Paper.pdf>>, in HLT-NAACL, 2004, 8 pages.

Han, et al., "Collective Entity Linking in Web Text: A Graph-Based Method," retrieved at <<http://www.nlpr.ia.ac.cn/2011papers/gjhy/gh133.pdf>>, Proceedings of the 34th International ACM SIGIR Conference on Research and Development in Information Retrieval, Jul. 2011, pp. 765-774.
Han, et al., "Named Entity Disambiguation by Leveraging Wikipedia Semantic Knowledge," retrieved at <<http://avss2012.org/cip/ZhaoJunPublications/paper/CIKM2009.NED.pdf>>, Proceedings of the 18th ACM Conference on Information and Knowledge Management, 2009, 10 pages.
Hoffart, et al., "Robust Disambiguation of Named Entities in Text," retrieved at <<http://aclweb.org/anthol ogy-new/D/D11/D11-1072.pdf>>, Proceedings of the 2011 Conference on Empirical Methods in Natural Language Processing, Jul. 2011, pp. 782-792.
Kulkarni, et al., "Collective Annotation of Wikipedia Entities in Web Text," retrieved at <<http://www.cc.gatech.edu/-zha/CSE8801/query-annotation/p457-kulkarni.pdf>>, Proceedings of the 15th ACM SIGKDD International Conference on Knowledge Discovery and Data mining, 2009, pp. 457-465.
Cheng, et al., "Fuzzy Matching of Web Queries to Structured Data," retrieved at <<htlp://ieeexplore.ieee.org>>, 2010 IEEE 26th International Conference on Data Engineering (ICDE), Mar. 2010, pp. 713-716.
Chen, et al., "A Query Substitution-Search Result Refinement Approach for Long Query Web Searches," retrieved at <<http://ieeexplore.ieee.org/stamp/stamp.jsp?tp=&arnumber=5286069>>, Proceedings of the IEEE/WIC/ACM International Joint Conferences on Web Intelligence and Intelligent Agent Technologies, Sep. 15, 2009, pp. 245-251.
Jain, et al., "Domain-Independent Entity Extraction from Web Search Query Logs," retrieved at <<http://www.marcopennacchiotti.com/pro/publications/WWW_2011_2.pdf>>, Proceedings of the 20th International Conference Companion on World Wide Web, Mar. 28, 2011, pp. 63-64.
Chaudhuri, et al., "Robust and Efficient Fuzzy Match for Online Data Cleaning," retrieved at <<http://research.microsoft.com/pubs/75996/bm_sigmod03.pdf>>, SIGMOND 2003, 2003, pp. 313-324.
Minjuan, et al., "Pseudo-Relevance Feedback Driven for XML Query Expansion," retrieved at <<http://www.aicit.org/jcit/ppl/JCIT0509_15.pdf>>, Journal of Convergence Information Technology, vol. 5, No. 9, Nov. 2010, pp. 146-156.
Pasca, Marius, "Weakly-Supervised Discovery of Named Entities Using Web Search Queries," retrieved at <<http://www.acm.org>>, Proceedings of the Sixteenth ACM Conference on Conference on Information and Knowledge Management, Nov. 2007, pp. 683-690.
Kim, et al., "A comparison of collocation-based similarity measures in query expansion," Information Processing and Management, No. 35, 1999, pp. 19-30.
Schenkel, et al., "Efficient Top-k Querying over Social-Tagging Networks," retrieved at <<http://acm.org>>, Proceedings of the 31st Annual International ACM SIGIR Conference on Research and Development in Information Retrieval, Jul. 2008, 8 pages.
Tsoukalas, et al., "PLEDS: A Personalized Entity Detection System Based on Web Log Mining Techniques," retrieved at <<http://www2.fas.sfu.ca/pub/cs/techreports/2008/CMPT2008-06.pdf>>, WAIM, Proceedings of the Ninth International Conference on Web-Age Information Management, Jul. 2008, pp. 1-23.
Peters, et al., "Folksonomy and Information Retrieval," retrieved at <<http://wwwalt.phil-fak.uni-duesseldorf.de/infowiss/admin/public_dateien/files/1/1194344432asist_am07.pdf>>, Proceedings of the 70th ASIS&T Annual Meeting, vol. 44, 2007, 33 pages.
Chirita, et al., "PTAG: Large Scale Automatic Generation of Personalized Annotation TAGs for the Web," retrieved at <<http://acm.org >>, Proceedings of the 16th International Conference on World Wide Web, May 2007, pp. 845-854.
Chaudhuri, et al., "Exploiting Web Search to Generate Synonyms for Entities," retrieved at <<http://www2009.org/proceedings/pdf/p151.pdf>>, Proceedings of the 18th International Conference on World Wide Web, Apr. 2009, pp. 151-160.
Chaudhuri, et al., "Mining Document Collections to Facilitate Accurate Approximate Entity Matching," retrieved at <<http://www.vldb.org/pvldb/2/vldb09-315.pdf>>, Proceedings of the VLDB Endowment, vol. 2, No. 1, Aug. 2009, 12 pages.

(56) References Cited

OTHER PUBLICATIONS

Agrawal, et al., "Exploiting web search engines to search structured databases," retrieved at <<http://acm.org>>, Proceedings of the 18th International Conference on World Wide Web, Apr. 2009, pp. 501-510.
Agrawal, et al., "Scalable Ad-hoc Entity Extraction from Text Collections," retrieved at <<http://www.acm.org>>, Proceedings of the VLDB Endowment VLDB Endowment, vol. 1, Issue 1, Aug. 2008, pp. 945-957.
Baroni, et al., "Using cooccurrence statistics and the web to discover synonyms in a technical language," retrieved at <<http://clic.cimec.unitn.it/marco/publications/lrec2004/syn_lrec_2004.pdf>>, Proceedings of the LREC 2004, 2004, 4 pages.
Dong, et al., "Reference Reconciliation in Complex Information Spaces," retrieved at <<http://acm.org>>, Proceedings of the 2005 ACM SIGMOD International Conference on Management of Data, 2005, pp. 85-96.
"Distributional hypothesis," retrieved at <<http://en.wikipedia.org/wiki/Distributional_hypothesis>>, retrieved on Mar. 1, 2011, Wikipedia online encyclopedia excerpt, 2 pages.
Isard, et al., "Dryad: Distributed Data-Parallel Programs from Sequential Building Blocks," retrieved at <<http://research.microsoft.com/pubs/63785/eurosys07.pdf>>, EuroSys 2007, 2007, 14 pages.
Jones, et al., "Generating Query Substitutions," retrieved at <<http://acm.org>>, Proceedings of the 15th International Conference on World Wide Web, 2006, pp. 387-396.
Mei, et al., "Query suggestion using hitting time," retrieved at <<http://ACM.org>>, Proceedings of the 17th ACM Conference on Information and Knowledge Management, Oct. 2008, pp. 469-477.
Navarro, Gonzalo, "A Guided Tour to Approximate String Matching," retrieved at <<http://ACM.org>>, ACM Computing Surveys, vol. 33, Issue 1, Mar. 2001, pp. 31-88.
Guo, et al., "Named Entity Recognition in Query," retrieved at <<http://acm.org>>, Proceedings of the 32nd International ACM SIGIR Conference on Research and Development in Information Retrieval, Jul. 2009, pp. 267-274.
Pantel, et al., "Web-Scale Distributional Similarity and Entity Set Expansion," retrieved at <<http://www.aclweb.org/anthology/D/D09/D09-1098.pdf>>, Proceedings of the 2009 Conference on Empirical Methods in Natural Language Processing, Aug. 2009, pp. 938-947.
Sarkas, et al., "Structured Annotations of Web Queries," retrieved at <<http://acm.org>>, Proceedings of the 2010 International Conference on Management of Data, Jun. 2010, pp. 771-782.
Egenhofer, M.J., et al., "Determining Semantic Similarity Among Entity Classes from Difference Ontologies", IEEE Transactions on Knowldege and Data Engineering, vol. 15, No. 2, Mar. 1, 2003, pp. 442-456.
Voluntary Amendment Filed Feb. 28, 2015 From People's Republic of China Patent Application No. 201380013249.X, 8 Pages.
"Non-Final Office Action," dated Jan. 15, 2015, From U.S. Appl. No. 13/413,179, 42 Pages.
Han et al., "Mining Frequent Patterns without Candidate Generation" Proceedings of the 2000 ACM SIGMOD international Conference on Management of Data, pp. 1-12, 2000.
Klapaftis, et al., "Google & WordNet based Word Sense Disambiguation", Workshop on Learning & Extending Ontologies Bonn Germany, Aug. 2005, 5 pages.
Kowalski, et al., "Information Storage and Retrieval Systesm", Kluwer Academic Publishers, 2002, 36 pages.
Ananthanarayanan et al., "Rule Based Synonyms for Entity Extraction from Noisy Text", Proceedings of the Second Workshop on Analytics for Noisy Unstructured Text Data, pp. 31-38, 2008.
Appelt et al., "Introduction to Information Extraction Technology", Proceedings of the International Joint Conference on Artificial Intelligence Tutorial, 1999.
Arasu et al., "Transformation-Based Framework for Record Matching" Proceedings of the 24th IEEE International Conference on Data Engineering, pp. 40-49, 2008.
Arasu et al.,"Learning String Transformations from Examples", Proceedings of the Publication of Very Large Database Endowment, pp. 2(1):514-525, 2009.
Chaiken et al., "Scope: Easy and Efficient Parallel Processing of Massive Data Sets", Proceedings of Very Large Database Endowment, pp. 1(2):1265-1276, 2008.
Dagan et al., "Contextual Word Similarity and Estimation from Sparse Data", Computer Speech and Language, 9:123-152, 1993.
Dean et al., "MapReduce: Simplified Data Processing on Large Clusters", Communications of the ACM—50th Anniversary Edition, vol. 51 Issue 1, pp. 107-113, Jan. 2008.
Examiner-Initiated Interview Summary dated Nov. 16, 2015 from U.S. Appl. No. 13/531,493, 2 pages.
Artiles et al., "WePS-3 Evaluation Campaign: Overview of the Web People Search Clustering and Attribute Extraction Tasks", Proceedings of CLEF 2010, 15 pages.
Graupmann, Jens, "Concept-Based Search on Semi-structured Data Exploiting Mined Semantic Relations," EDBT2004 Workshops, LNCS 3268, Eds. W. Lindner et al., Springer-Verlag, Berlin Heidelberg, 2004, pp. 34-43, 10 pages.
Notice on the First Office Action dated Apr. 13, 2016 from China Patent Application No. 201380013249.X, 15 pages.
Non-Final Office Action dated Apr. 5, 2016 from U.S. Appl. No. 14/864,430, 15 pages.
Notice of Allowance dated May 16, 2016 from U.S. Appl. No. 13/531,493, 35 pages.
Aymerich et al., "Automatic Extraction of Entries for a Machine Translation Dictionary Using Bitexts," Machine Translation Summit XI, Sep. 10, 2007, 7 pages.
Bellahsene et al., "Schema Matching and Mapping," Springer, 2011, 326 pages.
Haveliwala, Taher H., "Topic-Sensitive PageRank," WWW 2002, May 7-11, 2002, Honolulu, Hawaii, 10 pages.
Nie et al., "Unknown Word Detection and Segmentation of Chinese using Statistical and heuristic Knowledge," Communications of COLIPS, 1995, vol. 5, No. 1-2, 11 pages.
Rodriguez et al., "Determining Semantic Similarity among Entity Classes from Different Ontologies," IEEE Transactions on Knowledge and Data Engineering, vol. 15, Issue 2, Mar. 1, 2003, pp. 442-456, 15 pages.
Non-Final Office Action dated Apr. 2, 2013 from U.S. Appl. No. 13/413,179, 30 pages.
Notice of Allowance dated May 22, 2015 from U.S. Appl. No. 12/235,635, 16 pages.
Requirement for Restriction/Election dated Sep. 12, 2011 from U.S. Appl. No. 12/478,120, 6 pages.
Response dated Oct. 12, 2011 to Requirement for Restriction/Election dated Sep. 12, 2011 from U.S. Appl. No. 12/478,120, 4 pages.
Applicant Initiated Interview dated Oct. 30, 2012 from U.S. Appl. No. 12/779,964, 3 pages.
Applicant Initiated Interview dated Mar. 21, 2014 from U.S. Appl. No. 12/779,964, 3 pages.
Examiner Initiated Interview dated Mar. 24, 2015 from U.S. Appl. No. 12/779,964, 2 pages.
Response dated Jul. 21, 2015 to Non-Final Office Action dated Apr. 29, 2015 from U.S. Appl. No. 12/779,964, 11 pages.
Chaudhuri, et al., "Mining the Web to Facilitate Fast and Accurate Approximate Match", Proceedings of WWW2009, Apr. 20-24, 2009, pp. 1-10.
"Non-Final Office Action," From U.S. Appl. No. 12/779,964, dated Feb. 14, 2012, 14 pages.
"Response to the Feb. 14, 2012 Non-Final Office Action," From U.S. Appl. No. 12/779,964, filed Jun. 11, 2012.
"Final Office Action," From U.S. Appl. No. 12/779,964, dated Aug. 27, 2012.
"Response to the Aug. 27, 2012 Final Office Action," From U.S. Appl. No. 12/779,964, filed Nov. 1, 2012.
"Non-Final Office Action," From U.S. Appl. No. 12/779,964, dated Nov. 19, 2013.
"Response to the Nov. 19, 2013 Non-Final Office Action," From U.S. Appl. No. 12/779,964, filed Feb. 18, 2014.

(56) References Cited

OTHER PUBLICATIONS

"Final Office Action," From U.S. Appl. No. 12/779,964, dated Jun. 3, 2014.
"Response to the Jun. 3, 2014 Final Office Action," From U.S. Appl. No. 12/779,964, filed Oct. 2, 2014.
Voluntary Amendment dated Jul. 1, 2015 from China Patent Application No. 201380044316.4, 10 pages.
Notice of Allowance and Examiner Initiated Interview Summary dated Nov. 6, 2015 from U.S. Appl. No. 12/779,964, 17 pages.

* cited by examiner

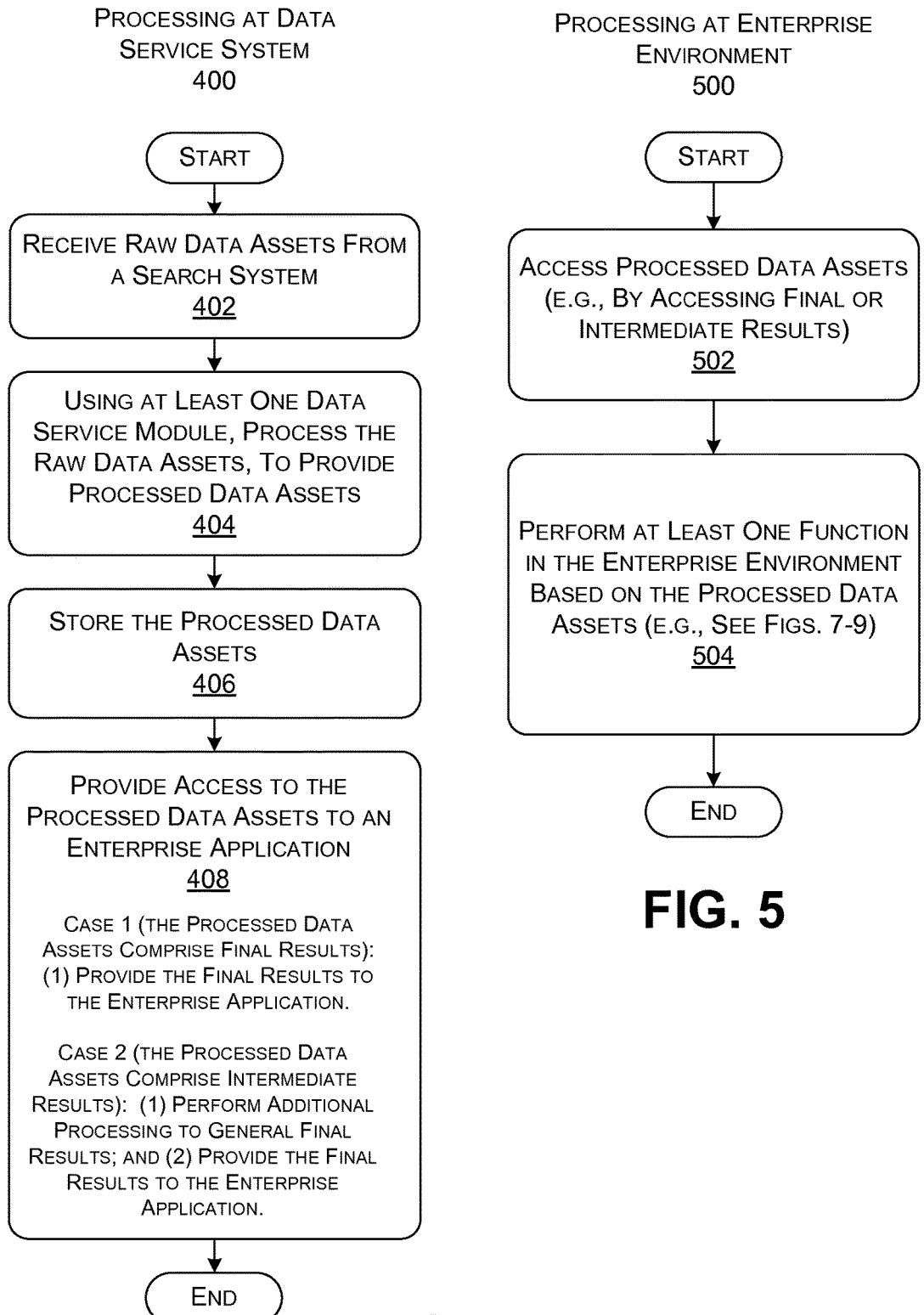

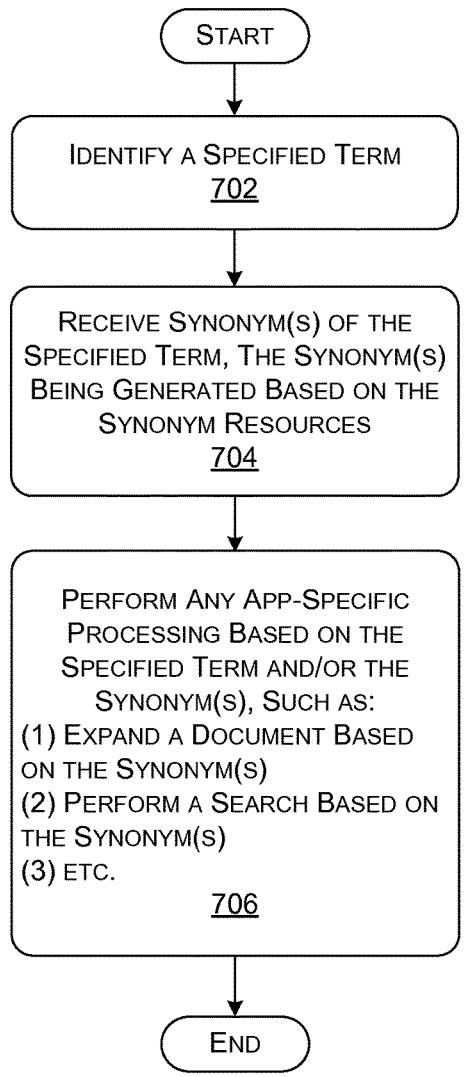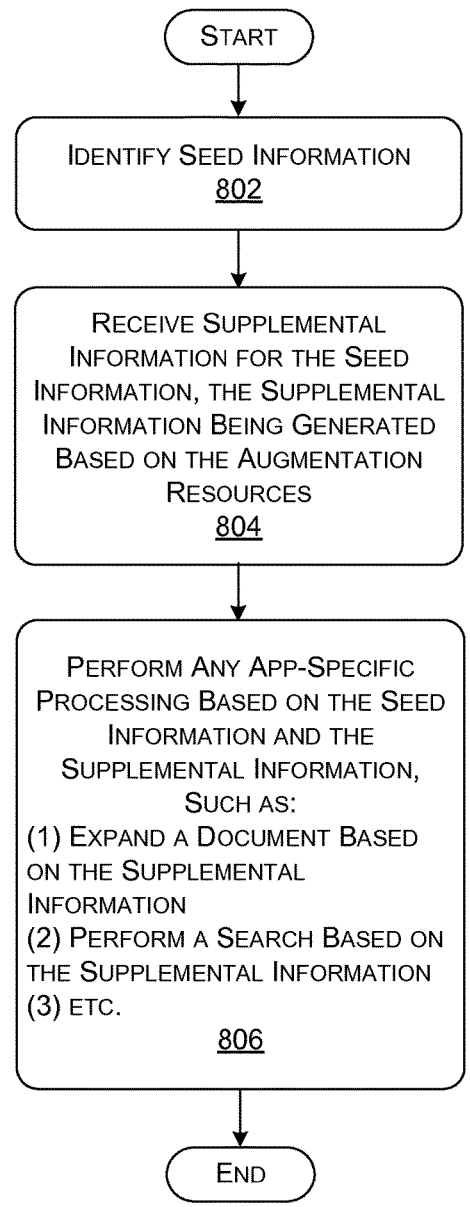
FIG. 7
FIG. 8

DATA SERVICES FOR ENTERPRISES LEVERAGING SEARCH SYSTEM DATA ASSETS

BACKGROUND

Enterprise applications provide functionality for use by organizations. For example, one type of enterprise application allows users to locate product information within a product database. Another type of enterprise application allows users to create and edit various types of documents that have a bearing on the organization.

An application designer may seek to expand the functionality of an existing enterprise application. But some enterprise applications are designed in an insular manner, e.g., by incorporating functionality that is primarily designed to consume native data assets that are created and maintained by the organization. This characteristic may present challenges to the application designer in his or her effort to modify the enterprise application.

SUMMARY

A data service system is described herein which receives system data assets ("raw data assets") from at least one network-accessible system (e.g., a search system). For example, the raw data assets may correspond to query log data, Web content, social media data, shopping-related data, map-related data, etc. The data service system may process the raw data assets in various ways, to produce processed data assets. The data service system can then make the processed data assets available to enterprise applications. Each enterprise application can consume the processed data assets in different environment-specific ways. By virtue of this strategy, an enterprise application can leverage the rich data assets provided by a network-accessible system, even though these data assets can be considered "foreign" to the environment in which the enterprise application traditionally operates. Further, in some cases, the enterprise application can leverage these new data assets without extensive revisions to its existing framework.

Without limitation, the Detailed Description sets forth three illustrative examples of processing that may be performed by the data service system. In a first case, a synonym-generating data service module processes the raw data assets from the network-accessible system to provide synonym resources. An enterprise application can leverage the synonym resources to provide synonyms for specified terms associated with entities. In a second case, an augmentation data service module processes the raw data assets to provide augmentation resources. An enterprise application can use the augmentation resources to provide supplemental information, given specified seed information. In a third case, a spelling information data service module leverages the raw data assets to provide spelling-correction resources. An enterprise application can leverage the spelling-correction resources to provide spelling information for specified terms.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 is a flowchart that provides an overview of one manner of operation of the data service system of FIG. 1.

FIG. 5 is a flowchart that provides an overview of one manner of operation of an enterprise application of FIG. 1.

FIG. 7 is a flowchart that describes one way in which an enterprise application can consume synonym resources provided by a synonym-generating data service module (SGDSM).

FIG. 8 is a flowchart that describes one way in which an enterprise application can consume augmentation resources provided by an augmentation data service module (ADSM).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment in which enterprise applications consume processed data assets, provided by a data service system. Section B describes illustrative algorithms for generating the processed data assets. Section C describes illustrative computing functionality that can be used to implement any aspect of the features described in Sections A and B.

Figure 19:
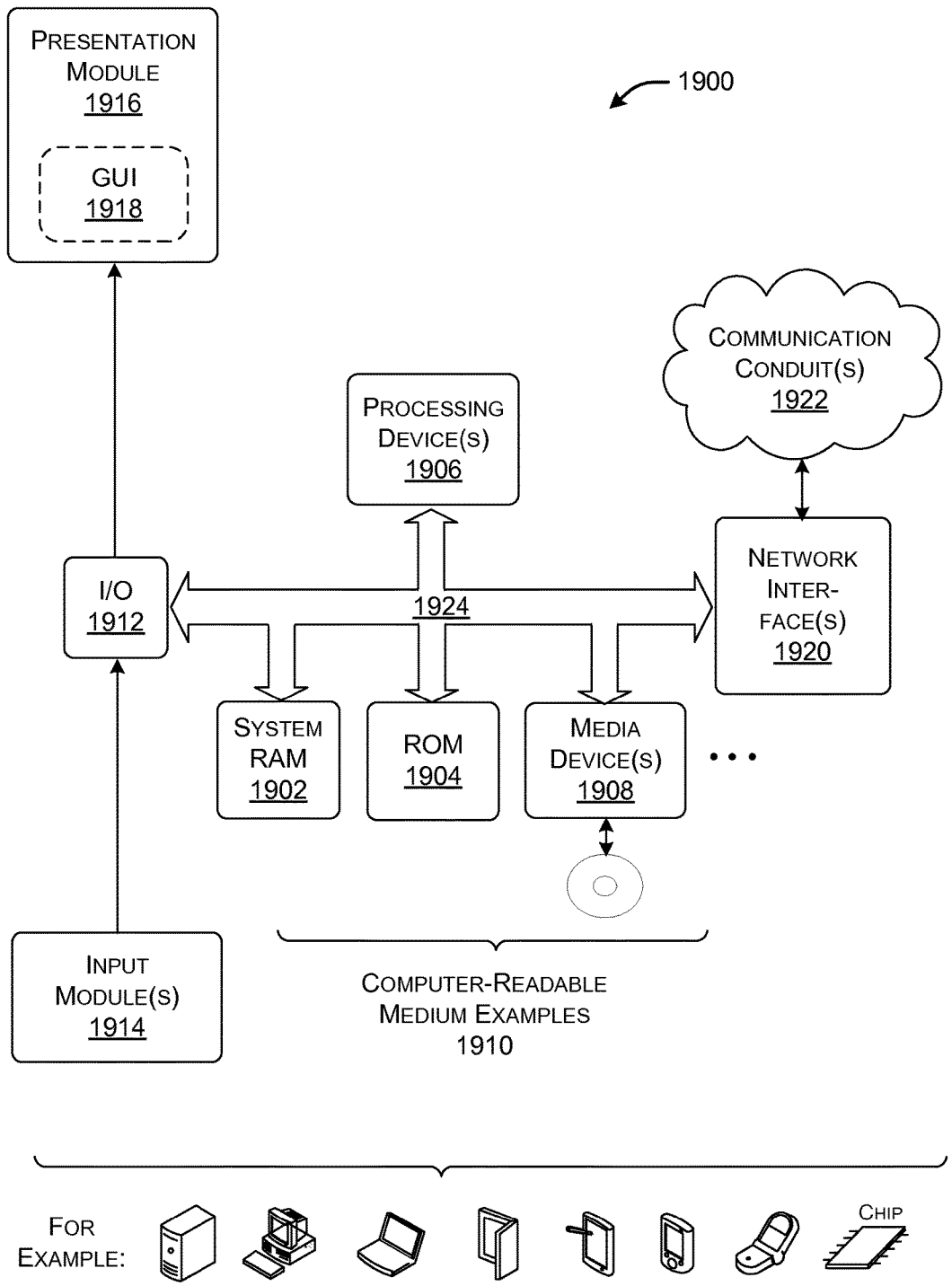
FIG. 19 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 19, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by computing functionality, a logic component represents an electrical component that is a physical part of the computing functionality, however implemented.

The phrase "means for" in the claims, if used, is intended to invoke the provisions of 35 U.S.C. § 112, sixth paragraph. No other language, other than this specific phrase, is intended to invoke the provisions of that portion of the statute.

Figure 1:
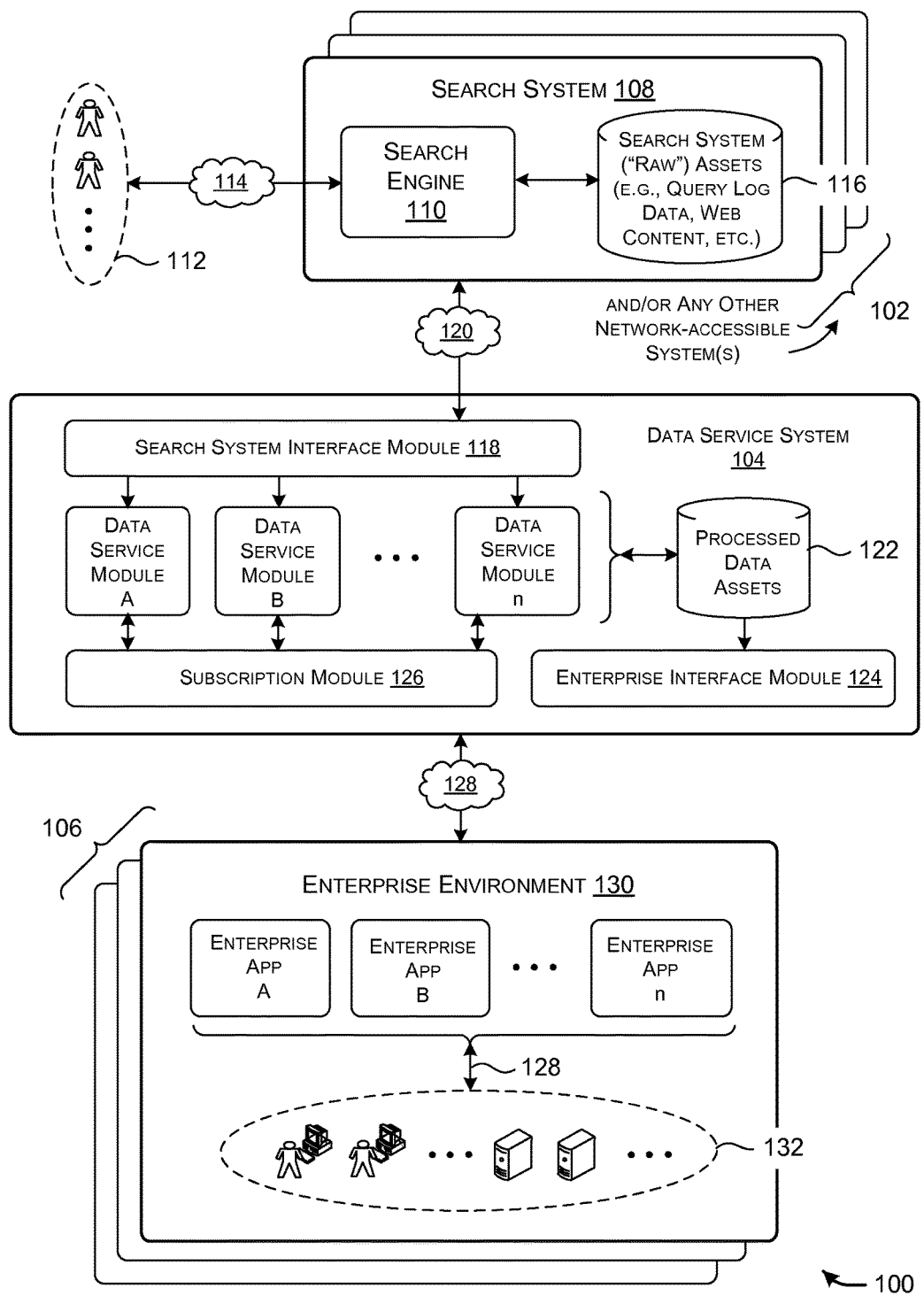
FIG. 1 shows an illustrative environment that allows enterprise applications to access processed data assets, provided by a data service system.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview FIG. 1 shows an illustrative environment 100 that includes the following principal components: one or more search systems 102; a data service system 104; and one or more enterprise environments 106. Each enterprise environment includes one more enterprise applications. An enterprise application corresponds to any functionality for principal use by an organization, for performing any function or combination of functions. The organization may pertain to a company, a non-profit entity, an educational institution, a governmental organization, etc.

This section will describe each of the principal components in turn. Starting at the top of the figure, FIG. 1 depicts the composition of one illustrative search system 108. The other search systems 102 may have a similar composition. In some implementations, the search system 108 may represent a commercial Internet search system, such as the Bing® search system provided by Microsoft Corporation of Redmond, Wash., the search system provided by Google Inc. of Mountain View, Calif., and so on.

In a typical case, the search system 102 includes a search engine 110 that receives search queries from a plurality of users 112 via a communication conduit 114. The users 112, in one case, may correspond to members from the general public. The communication conduit 114 may correspond to a wide area network (such as the Internet), a local area network, etc. For each such query, the search engine 110 uses an index to identify items which match the query. In one case, the items may correspond to documents, websites, and other data that are stored in a distributed fashion over the Internet. The search engine 110 can use conventional mechanisms to crawl the Internet to identify the existence of available items.

The search engine 110 can store query log data in a data store 116. The query log data provides a historical record of the search actions performed by the users 112. For example, in one case, the query log data can list the queries that the users 112 have submitted. In addition, the query log data can optionally identify the documents that the users 112 have selected in response to the submission of their queries. For example, assume that a user enters the query "Space Needle Seattle." In a conventional fashion, the search engine 110 can generate a list of items that match the query. The user may choose to "click on" one or more of the items in this list, or otherwise convey an interest in these items (e.g., by hovering over the items with a mouse device or the like). In response to these actions, the search engine 110 can store at least the following information: the query submitted by the user; a record of the items presented to the user in response to the query (i.e., the impressions); and items that the user selected after viewing the search results.

In addition, or alternatively, the search engine 110 can store information pertaining to network-accessible content that it discovers when crawling the Internet. In addition, or alternatively, the search engine 110 can store demographic information regarding the users who interact with the search engine 110. In addition, or alternatively, the search engine 110 can store information which characterizes the search habits of users. In addition, or alternatively, the search engine 110 can store information regarding the manner in which it has automatically reformulated the queries of the users 112, e.g., so as to correct presumed spelling errors in the queries, and so on.

For ease of reference, any information that the search system 108 stores may be regarded as search system data assets, or, more succinctly stated, raw data assets. The data assets are qualified raw in the sense that these assets have not yet been processed by the data service system 104; however, the raw data assets may potentially represent the outcome of processing performed by the search system 108. In general, the environment 100 can employ suitable policies to honor the privacy expectations of the users regarding the storage and use of personal information, as set forth in greater detail in Section C below.

The environment 100 may also include additional entities that provide data assets for use by the data service system 104. For example, another type of system (not shown) corresponds to a social network system. A social network system may store information that users post to their personal pages, messages exchanged by users, and so on. This kind of information may be referred to as social media data. Another type of system (not shown) corresponds to a shopping system. That system can provide information regarding items purchased by users, items viewed by the users (without purchasing of the items), and so on. This kind of information may be referred to as shopping-related data. Another type of system (not shown) corresponds to a navigation system which provides information regarding features in a geographic area, including the positions of users who traverse the geographic area. This kind of information may be referred to as map-related data. These examples are cited by way of illustration, not limitation.

For the above reason, the search systems 102 represent just one type of a broader category of information-rich network-accessible systems. Each such network-accessible system stores a relatively large amount of data assets by virtue of its interaction with a relatively large population of users via a wide area network. And that population is not confined to the members of any one organization. The raw data assets provided by the network-accessible system can be generically referred to as system data assets. Nevertheless, to facilitate and concretize the explanation, the environment 100 will be principally described below in the context of one or more search systems 102 which provides search system data assets.

The data service system 104 may include a search system interface module 118 for interacting with the search systems 102 via any communication conduit 120. The communication conduit 120 may represent any of wide area network (e.g., the Internet), a local area network, a point-to-point communication link, etc. The search system interface module 118 can receive the raw data assets using any protocol, such as on a push basis, a pull basis, or some combination thereof. For example, in a push strategy, the search systems 102 can independently forward the raw data assets to the data service system 104 on a periodic basis or any other basis. In a pull strategy, the search system interface module 118 can request the raw data assets from the search systems 102 on a periodic basis or any other basis. Any contractual relationship may govern this exchange. In some cases, the entity which administers at least some of the search systems 102 may differ from the entity which administers the data service system 104; in other cases, the entities may overlap at least in part.

The data service system 104 includes one or more data service modules (A, B, . . . n) that process the raw data assets to provide processed data assets. The data service system 104 stores the processed data assets in a data store 122. The processed data assets represent any kind of transformation of the raw data assets. To cite just one example, one type of data service module can process query log data to generate synonym resources. In one case, the synonym resources may correspond to final processing results. The final processing results may map a set of source terms to their corresponding synonyms. An enterprise application module can use the final results to discover the synonyms for one or more specified terms of interest. In addition, or alternatively, the synonym resources may correspond to intermediate processing results. The intermediate processing results can later be leveraged, based on a request from an enterprise application, to generate synonyms for one or more specified terms. In other words, in the latter case, the data service module does not generate the synonyms in advance of a request by the enterprise application, but provides the intermediate resources that can be used to generate the synonyms. In addition, or alternatively, the data service module and/or the enterprise application can perform additional post-request processing on the synonyms, such as fuzzy matching, etc. Section B provides additional details regarding representative types of processing that may be performed by the data service modules, and the processed data assets produced as a result thereof.

An enterprise interface module 124 allows the enterprise environments 106 to access the processed data assets. Additional detail will be set forth below regarding the manner in which an enterprise application may gain access to processed data assets (in connection with the description of FIGS. 2 and 3).

Any contractual relationship can govern access to the processed data assets by the enterprise environments 106. In one case, a subscription module 126 maintains subscriptions purchased or otherwise acquired by the various enterprise environments 106. Each subscription authorizes an enterprise environment to receive and consume processed data assets, under stated conditions. In connection therewith, the entity which administers the data service system 104 can offer plural levels of access rights at different respective costs.

In yet other cases, an application designer can design an enterprise application so that it has "hardwired" access to at least some of the processed data assets. Here, an enterprise environment has implicit right to access the processed data assets by virtue of the fact that it has purchased the enterprise application in question. The entity which administers the data service system 104 can rely on yet other strategies to grant access rights to its processed data assets.

The enterprise environments 106 can access the processed data assets through any communication conduit 128. For example, the communication conduit 128 may represent any of a wide area network (e.g., the Internet), a local area network, a point-to-point communication link, etc.

FIG. 1 shows an illustrative enterprise environment 130 that may consume the processed data assets. As stated above, the enterprise environment 130 can host one or more enterprise applications (e.g., A, B, . . . n). Different entities 132 may consume the services provided by the enterprise applications. Such entities 132 may include users within and/or outside a particular organization associated with the enterprise environment 130. In addition, or alternatively, the entities 132 may include automated functionality which utilizes the processed data assets as input to its own processes.

The entities 132 may interact with the enterprise applications via a communication conduit 134, such as a wide area network, a local area network, a point-to-point communication link, etc. For example, an enterprise application may be implemented by one or more servers within the enterprise environment 130. A user may operate any type of computer to interact with this enterprise application via, for instance, a local area network. In another case, the enterprise application may be implemented on a local computer, and the user can interact with the enterprise application via that computer. In another case, the enterprise application can be distributed between local and remote processing resources provided by the enterprise environment 130 (with respect to the location of the user who interacts with the enterprise application).

More generally stated, the functionality shown in FIG. 1 can be implemented in any manner. For example, the search system 108 can be implemented by one or more servers and associated data stores. Likewise, the data service system 104 can be implemented by one or more servers and associated data stores. More specifically, in one case, the data service system 104 can be implemented as a data processing "cloud" that is accessible to the enterprise environments 106 via the Internet or some type of network. The enterprise environment 130 can include a collection of equipment associated with an organization, such as servers, data stores, personal computers, computer workstations, portable computers of any type (e.g., laptop computers, tablet computers, smartphones, etc.). In general, any of the functionality provided by any of the components described above can be located at a single site or distributed over plural sites.

Figure 2:
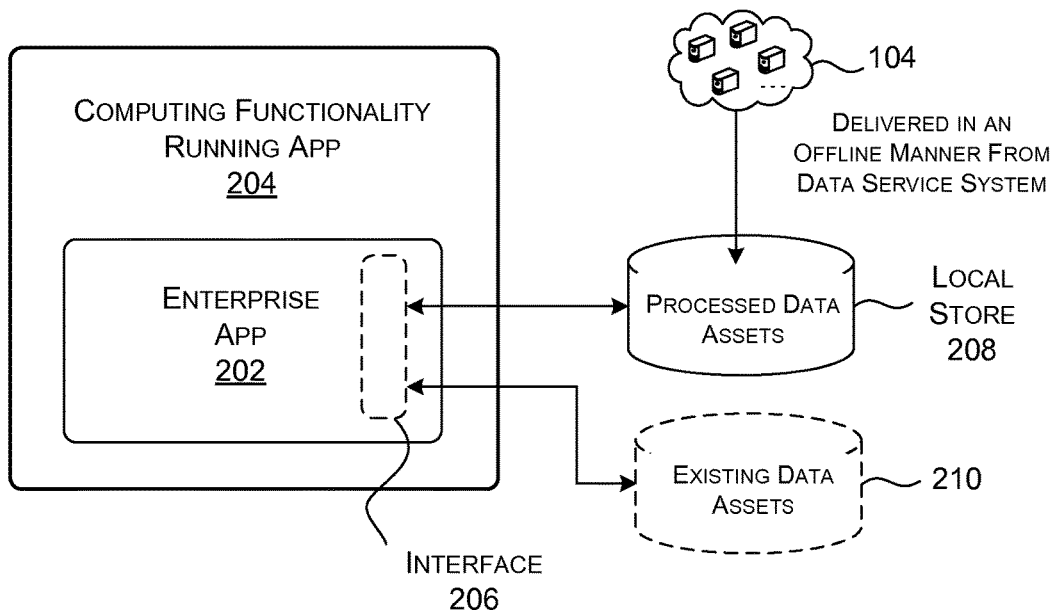
FIGS. 2 and 3 show two strategies by which an enterprise application may access processed data assets provided by the data service system.

Advancing now to FIG. 2, this figure illustrates one manner by which an enterprise application 202, in the hosting enterprise environment 130, can access processed data assets. Computing functionality 204 of any type runs the enterprise application. For instance, the computing functionality 204 may correspond to a user computer of any type, a server computer, etc. The enterprise application 202 accesses the processed data assets through an appropriate interface 206, such as an API or the like.

In the implementation of FIG. 2, the data service system 104 delivers at least part of the processed data assets to the enterprise environment 130 in an offline manner. That is, the enterprise environment 130 receives the processed data assets prior to the point in time at which the enterprise application 202 requires them to perform its functions. The enterprise environment 130 then stores these processed data assets in a local data store 208. In one scenario, for example, the processed data assets may correspond to a spelling-correction dictionary produced by the data service system 104. Later, during an appropriate juncture in the running of the enterprise application 202, the enterprise application may access the processed data assets via the interface 206. The enterprise application 202 can also optionally access pre-existing local data assets provided in a data store 210 (such as, in one case, a native spelling-correction dictionary).

Figure 3:
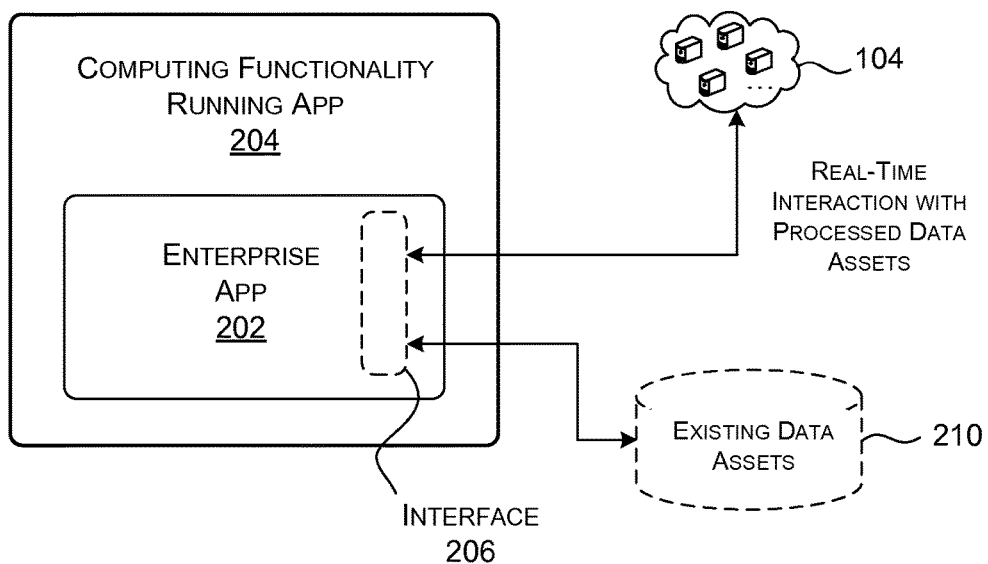

In the implementation of FIG. 3, by contrast, the enterprise application 202 may access the processed data assets provided in the data service system 104 in an online manner. That is, the enterprise application 202 accesses these processed data assets when it needs them to perform its functions. In this case, the enterprise application 202 need not download the processed data assets as a whole.

As mentioned above, the processed data assets may represent final results or intermediate results, or some combination thereof. In the latter case, the enterprise application 202 may instruct the data service system 104 to perform additional on-demand processing based on intermediate processed data assets, given specified input information supplied by the enterprise application. In some implementations, the data service system 104 can even make on-demand processing requests to the search system 108. Alternatively, or in addition, the enterprise application 202 may itself perform additional processing based on the intermediate processed data assets provided by the data service system 104.

The scenarios depicted in FIGS. 2 and 3 represent merely two ways that the enterprise application 202 can consume processed data assets; still other techniques can be used.

FIG. 4 shows a procedure 400 that represents an overview of one manner of operation of the data service system 104 of FIG. 1. In block 402, the data service system 104 receives raw data assets from at least one search system 108 (or, more generally, from at least one network-accessible system). In block 404, the data service system 104 uses at least one data service module to provide processed data assets based on the raw data assets. In block 406, the data service system 104 stores the processed data assets. In block 408, the data service system 104 provides access to an enterprise application to the processed data assets, e.g., using any access technique described above in connection with FIGS. 2 and 3.

Block 408 further enumerates the two possibilities described above. In the first case, the processed data assets correspond to final results. Here, block 408 entails providing the final results to the enterprise application. In the second case, the processed data assets correspond to intermediate results. Here, block 408 entails: (1) Performing additional processing based on input received from the enterprise application, in conjunction with the intermediate results, to provide final results; and (2) Providing the final results to the enterprise application. Alternatively, or in addition, the enterprise application itself may transform the intermediate results into the final results. The nature of what constitutes "intermediate results" may vary for different application scenarios. Section B sets forth particular examples of what may constitute intermediate results in the context of three scenarios. Indeed, in one case, the processing performed in block 404 may correspond to just selecting a subset of raw data assets for storage in the data store 122, without transformation of the raw data assets.

According to another illustrative aspect, a user may rate the performance of the processed data assets provided by the data service system 104, and then forward that rating to the data service system 104. For example, the user can provide a like/unlike rating, a numerical score rating, etc. At least one data service module can then use the rating to modify the way it generates the processed data assets. For example, one type of data service module can generate synonyms based on one or more similarity thresholds; those thresholds define how liberal the data service module is in labeling a candidate string as a valid synonym of an input term. The data service module can adjust these thresholds based on feedback from the user, thereby making the matching operation performed by this data service module more or less restrictive.

According to another illustrative aspect, at least one data service module can provide a confidence value (or values) along with the processed data assets. Each confidence value reflects the extent to which the data service module deems the processed data assets to be valid results, such as valid synonyms, valid augmentation of seed information, valid spelling corrections, etc.

Figure 9:
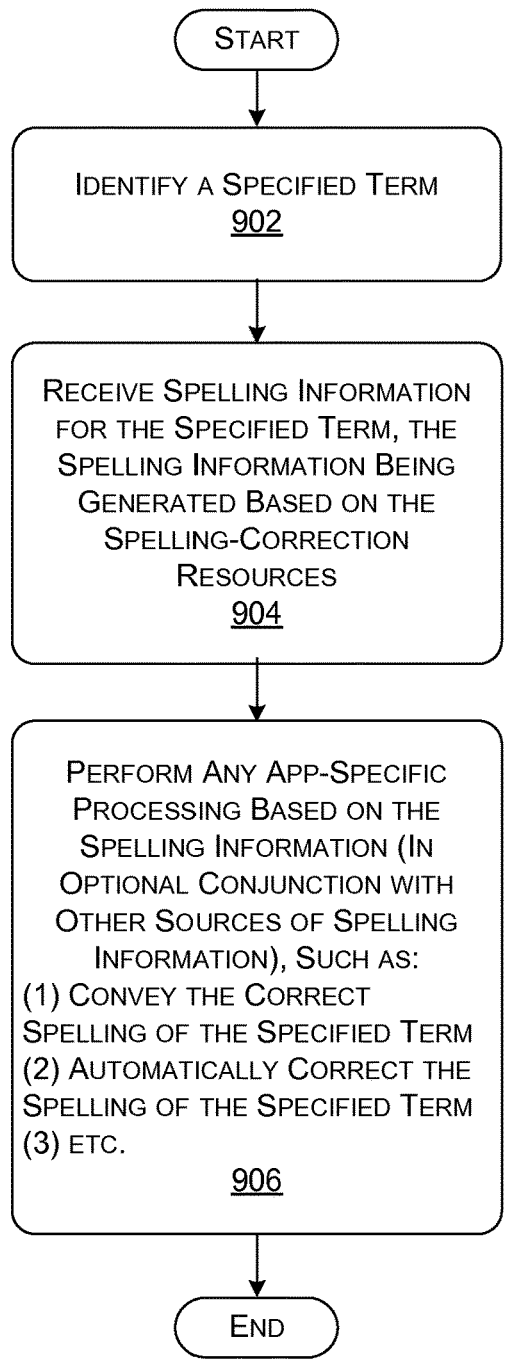
FIG. 9 is a flowchart that describes one way in which an enterprise application can consume spelling-correction resources provided by a spelling information data service module (SIDSM).

FIG. 5 shows a process 500 that provides an overview of one manner of operation of an enterprise application. In block 502, the enterprise application accesses the processed data assets. Once again, the processed data assets can correspond to final and/or intermediate results. In block 504, the enterprise application performs at least one function in the enterprise environment 130 based on the processed data assets. FIGS. 7-9, to be described below, set forth different operations that may be encompassed by block 504 of FIG. 5.

Figure 6:
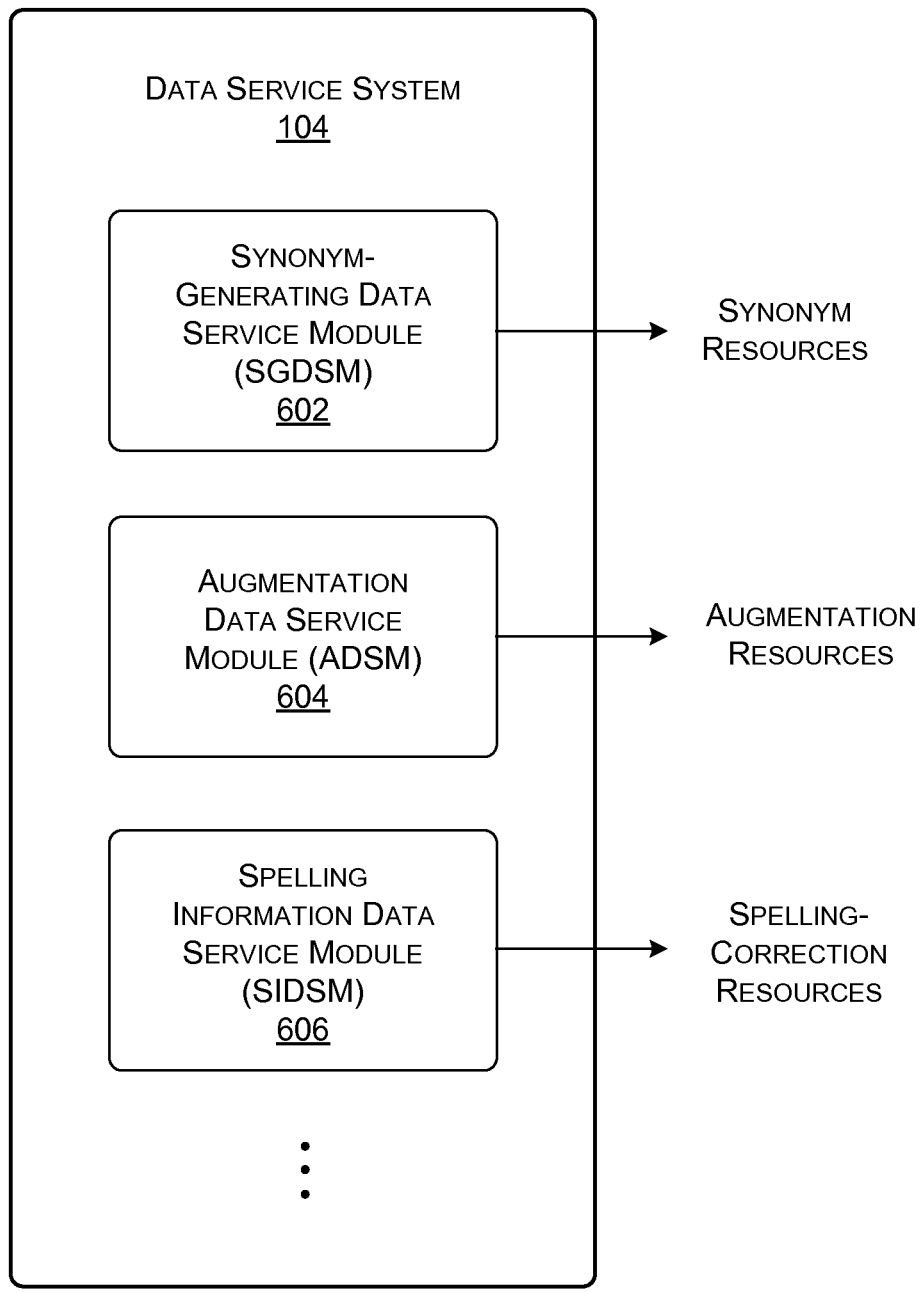
FIG. 6 shows one implementation of the data service system of FIG. 1; in this case, the data service system includes three particular types of data service modules.

FIG. 6 shows one implementation of the data service system 104 of FIG. 1, including three particular types of data service modules. That is, a synonym-generating data service module (SGDSM) 602 processes the raw data assets from the search system to generate synonym resources. An enterprise application can leverage the synonym resources to provide synonyms for specified terms. An augmentation data service module (ADSM) 604 processes the raw data assets to generate augmentation resources. An enterprise application can use the augmentation resources to provide supplemental information, given specified seed information. A spelling information data service (SIDSM) 606 leverages the raw data assets to generate spelling-correction resources. An enterprise application can leverage the spelling-correction resources to provide spelling information for specified terms. Section B describes additional details regarding the types of processing that may be performed by each of these three data service modules.

The data service system 104 can include yet other types of data service modules, although not shown in FIG. 6. Another type of data service module can generate purchase-related resources by mining raw data assets provided by a shopping system. Another type of data service module can provide relationship-related resources by mining raw data assets provided by a social network. Another type of data service module can provide location-related resources by mining raw data assets provided by a wireless communications provider, and so on.

FIG. 7 shows a procedure 700 that describes one way in which an enterprise application can consume synonym resources provided by a SGDSM 602. In block 702, the enterprise application identifies a specified term, such as the name of an enterprise. In block 704, the enterprise application receives one or more synonyms of the specified term, where the synonyms are generated (by the data service system 104 and/or the enterprise application) based on the synonym resources. In block 706, the enterprise application can perform any application-specific processing based on the specified term and/or the synonyms.

For example, in a first case, the enterprise application can identify a group of original terms in a table or other source content. The enterprise application can then use the synonym resources to provide one or more synonyms for each original term. The enterprise application can then add the synonyms to the original table, to provide an augmented table.

In a second case, the enterprise application may correspond to search functionality used by the enterprise environment 130 to perform searches over a local database. The search functionality can identify an original term in a search query that a user has submitted. The search functionality can then use the synonym resources to determine one or more synonyms for the original search term. The search functionality can then perform a search over the database based on the original term together with the generated synonym(s). Still other applications are possible.

FIG. 8 shows a process 800 that describes one way in which an enterprise application can consume augmentation resources provided by the ADSM 604. In block 802, the enterprise application identifies seed information. In block 804, the enterprise application receives supplemental information which pertains to the seed information, where the supplemental information is generated (by the data service system 104 and/or the enterprise application) based on the augmentation resources. In block 806, the enterprise application performs any application-specific processing based on the seed information and the supplemental information.

For example, in a first case, the enterprise application can identify a list of original entity names in any type of document or other source content. The enterprise application can then use the augmentation resources to provide supplemental information pertaining to the entity names. For example, suppose that the entity names correspond to company names. The enterprise application can leverage the augmentation resources to supply information pertaining to the locations, owners, etc. of the companies. The enterprise application can then add the supplemental information to the original document, to provide an enhanced document. Alternatively, or in addition, the enterprise application can use the supplemental information to correct any discovered inaccuracies in the original document.

In a second case, the enterprise application can identify at least one entity name within a document of any type, where that document belongs to a set of documents. For example, the document may correspond to an email in a repository of emails. The enterprise application can then use the augmentation resources to discover supplemental information regarding the entity name. The enterprise application can then use the original entity name in conjunction with the supplemental information to perform searches within the collection of documents. This allows the enterprise application to more thoroughly extract information regarding the entity name in question. Still other applications are possible.

FIG. 9 shows a process 900 that describes one way in which an enterprise application can consume spelling-correction resources provided by a SIDSM 606. In block 902, the enterprise application can identify a specified term, e.g., within a document or other source content. In block 904, the enterprise application can receive spelling information for the specified term, where the spelling information is generated (by the data service system 104 and/or the enterprise application) based on the spelling-correction resources. In block 906, the enterprise application can perform any application-specific processing based on the spelling information.

In a first case, for example, the enterprise application can use the spelling information to alert a user to a misspelled term within a document that the user is created, editing, or reading. In a second case, the enterprise application can automatically correct a misspelled term in the document.

More specifically, assume that the enterprise application corresponds to a text processor or the like. Further assume that the text processor has access to its own native spelling-correction algorithm and associated spelling-correction dictionary. For instance, the native spelling-correction algorithm may use an edit distance metric or the like to identify a correctly spelled counterpart of a misspelled word. In the instant case, the text processor can rely on both the native spelling-correction algorithm and the spelling-correction resources (provided by the data service system 104) to identify and correct misspellings. Each strategy of spelling correction may have its respective advantages. For instance, the spelling-correction resources may be superior to the native spelling-correction algorithm in at least two instances. First, the text processor can leverage the spelling-correction resources to identify a correctly spelled word that is "far" from its corresponding misspelled word, in terms of edit distance (as in "YouTube" vs. "U-tube"). Second, the text processor can leverage the spelling-correction resources to provide a more up-to-date spelling-correction dictionary, compared to the native spelling-correction dictionary.

B. Illustrative Data Service Processes

The data service system 104 can incorporate a wide variety of algorithms to transform raw data assets into processed data assets. Without limitation, this section describes three representative algorithms.

B.1. Generating Synonym Resources

Figure 10:
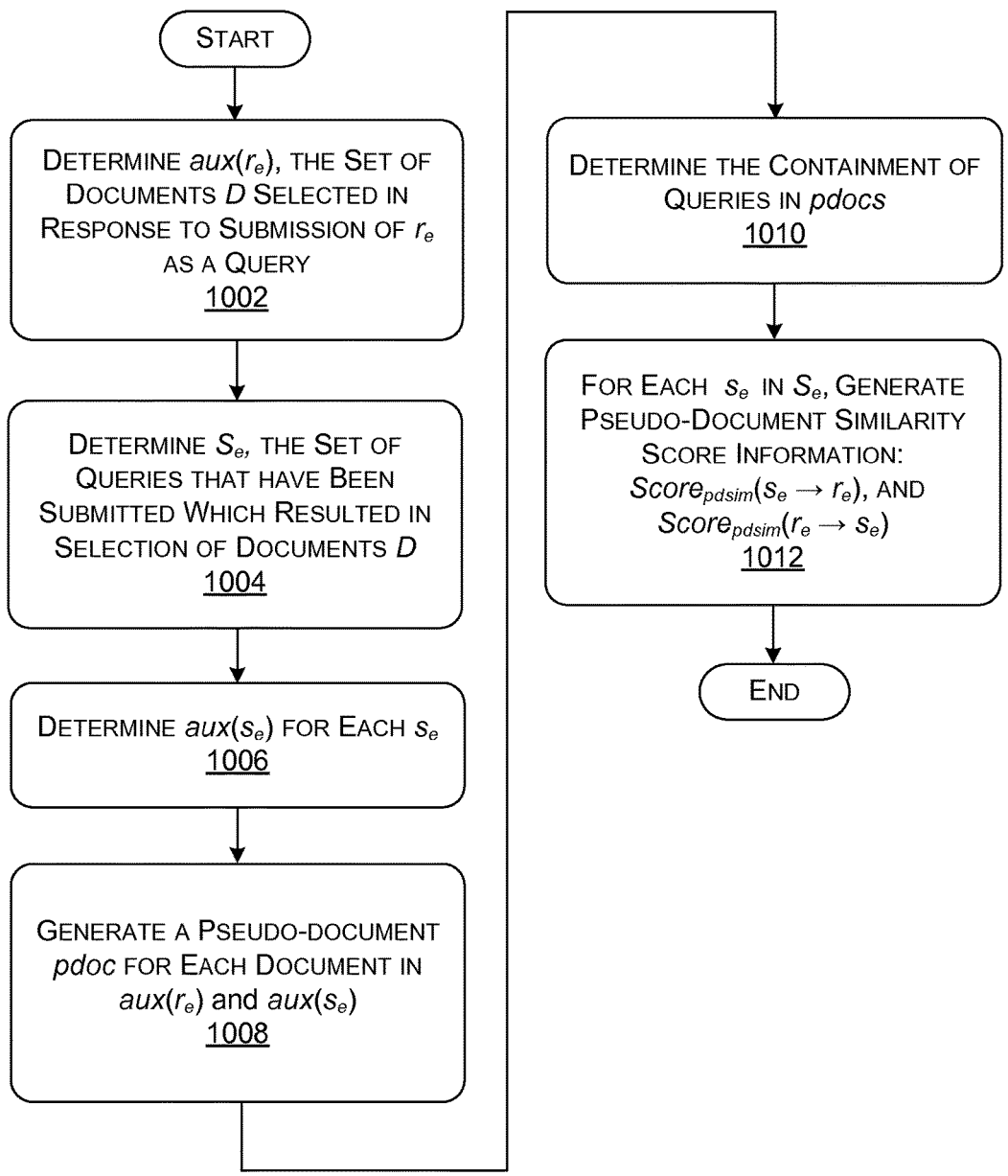
FIG. 10 is a flowchart that describes one process that the SGDSM can use to generate the synonym resources.

FIG. 10 shows one procedure 1000 that the synonym-generating data service module (SGDSM) 602 can use to generate a set of synonyms for at least one entity reference string $r_e$, associated with an entity e. For instance, $r_e$ may correspond to the name of a person, organization, product, location, event, etc. (That is, in many cases, $r_e$ may correspond to a proper noun, although it need not be a proper noun in all instances.) The string $r_e$ may be composed of one or more sub-terms. This subsection will explain the procedure 1000 with reference to the examples of FIGS. 11 and 12.

In general, the SGDSM 602 generates at least one synonym for the $r_e$ (if possible) by drawing from a set of potential candidate strings $S_e$, where $s_e$ refers to an individual candidate string in the set $S_e$. A synonym is a string, having one or more terms, which refers to the same entity e as $r_e$, but in a different manner than $r_e$.

In block 1002, the SGDSM 602 determines, using query log data, a set of documents D that have been selected in response to submitting $r_e$ as a query. This set of documents is also referred to as aux($r_e$). In block 1004, the SGDSM 602 determines, using the query log data, a set of queries that have been submitted and which have resulted in the selection of any of the documents in the set of documents D. This set of queries serves as a set of candidate strings $S_e$.

Figure 11:
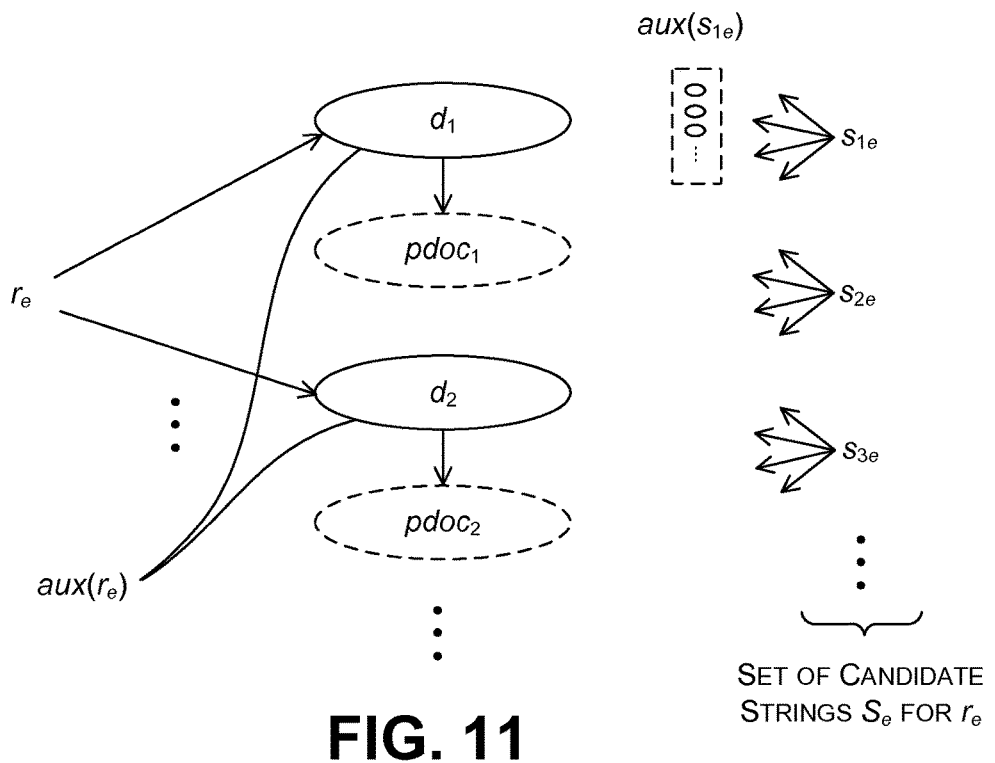
FIGS. 11 and 12 show examples for use in explaining the process of FIG. 10.

Consider the example of FIG. 11. Here, users who submitted the query reference string $r_e$ clicked on at least document $d_1$ and $d_2$. Users also submitted the queries $S_{1e}$ to reach the document $d_1$, and the queries $S_{2e}$ to reach the document $d_2$. Collectively, the subsets $S_{1e}$, $S_{2e}$, etc. constitute the set of candidate strings $S_e$. For example, assume that $r_e$ corresponds to the string "Space Needle." Further assume that at least one prior user who uses a search system has submitted the term "Space Needle," and, upon receiving a list of results from the search system, clicked on (or otherwise selected) a web page X related to the Space Needle tower in Seattle. This means that one of the documents d in the set D corresponds to the website X that this user accessed on a prior occasion. Further assume that at least one user accessed the Space Needle website X after submitting the different query "Seattle tower." This means that one of the candidate strings in the set of candidate strings $S_e$ will be "Seattle tower."

Returning to FIG. 10, in block 1006, the SGDSM 602 determines aux($s_e$) for each $s_e$, which corresponds to the set of documents selected by users in response to submitting $s_e$ as a query. In other words, this set of document parallels the set of documents D for $r_e$, but is produced based on $s_e$, not $r_e$.

Figure 12:
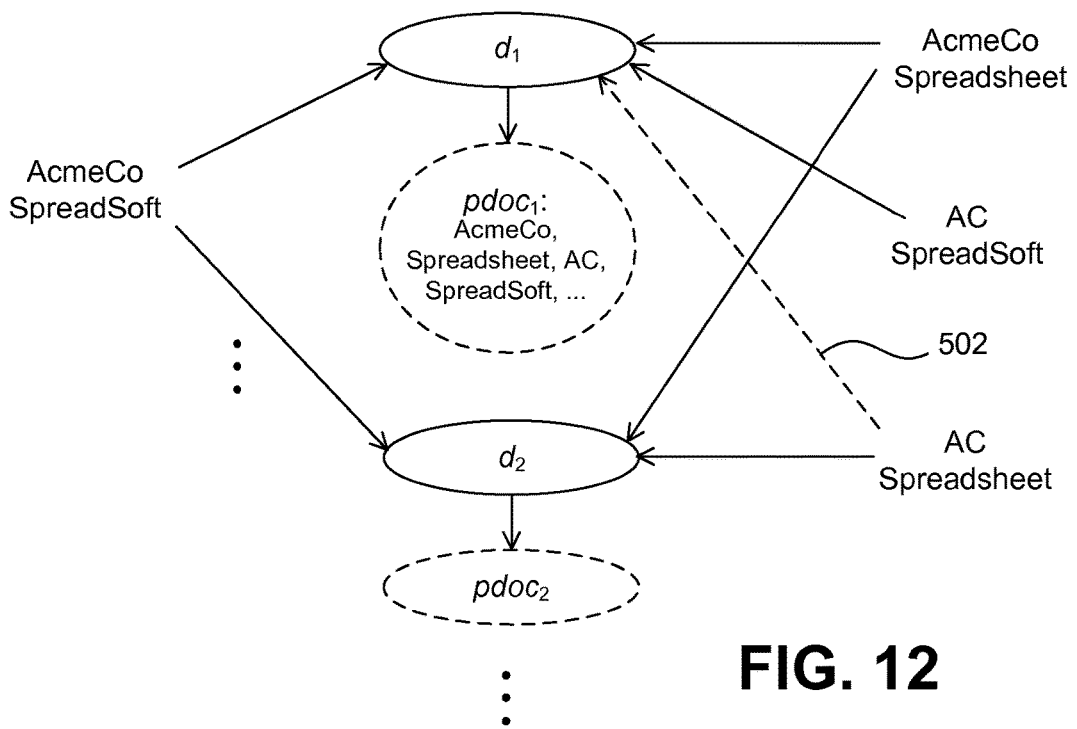

In block 1008, the SGDSM 602 determines pseudo-documents for the documents in aux($r_e$) and each aux($s_e$). A pseudo-document (pdoc) for a document d contains a combination of all the terms associated with all of the queries that are linked to d. A query is linked to d when a user accesses d in response to submitting the query. FIG. 12 sets forth an example which clarifies the nature of a pseudo-document. Assume that $r_e$ corresponds to the string "AcmeCo SpreadSoft," which is a (fictitious) name of a spreadsheet software product produced by a (fictitious) company, AcmeCo. Assume that the SGDSM 602 generates auxiliary information aux($r_e$) that comprises a collection of documents, two of which are shown in FIG. 12. Further assume that the candidate strings that are linked to the first two documents include "AcmeCo Spreadsheet," "AC SpreadSoft," and "AC Spreadsheet." In this case, the pseudo-document $pdoc_1$ for the first document $d_1$ includes at least the following terms: "AcmeCo," "Spreadsheet," "AC," and "SpreadSoft." This is because the queries "AcmeCo Spreadsheet" and "AC SpreadSoft" are linked to this document $d_1$, and these queries include the identified terms "AcmeCo," "Spreadsheet," "AC," and "SpreadSoft." The SGDSM 602 can also generate pseudo-documents with respect to the documents in each aux($s_e$) in the same manner described above.

Returning to FIG. 10, in block 1010, the SGDSM 602 determines, for each $s_e$ in $S_e$, a number of pseudo-documents pdocs (associated with aux($r_e$)) that include all of the terms in $s_e$. The SGDSM 602 can perform the complementary operation with respect to $r_e$, that is, by determining the number of pdocs (associated with aux($s_e$)) which include all of the terms in $r_e$.

In block 1012, the PDSAS 300 determines, for each $s_e$, a $Score_{pdsim}$ ($s_e \rightarrow r_e$) which measures the similarity of $s_e$ with respect to $r_e$, and a $Score_{pdsim}$ ($r_e \rightarrow s_e$) which measures the similarity of $r_e$ with respect to $s_e$. More formally stated, the similarity of a particular $s_e$ to $r_e$ can be computed by:

$$Score_{pdsim}(s_e \rightarrow r_e) = \frac{\text{number of } pdocs \text{ that include all the terms in } s_e}{\text{number of } docs \text{ } d \text{ in } aux\text{ }(r_e)}.$$

And the similarity of $r_e$ to a particular $s_e$ can be computed by:

$$Score_{pdsim}(r_e \rightarrow s_e) = \frac{\text{number of } pdocs \text{ that include all the terms in } r_e}{\text{number of } docs \text{ } d \text{ in } aux\text{ }(s_e)}.$$

In the first equation, the "pdocs" refers to those pdocs that are associated with the documents in the set aux($r_e$). In the second equation, "pdocs" refers to the those pdocs that are associated with the documents in the set aux($s_e$). The true synonyms of $r_e$ can be determined, at least in part, by selecting candidate strings that have $Score_{pdsim}(s_e \rightarrow r_e)$ scores and $Score_{pdsim}(r_e \rightarrow s_e)$ scores that satisfy prescribed thresholds.

Figure 13:
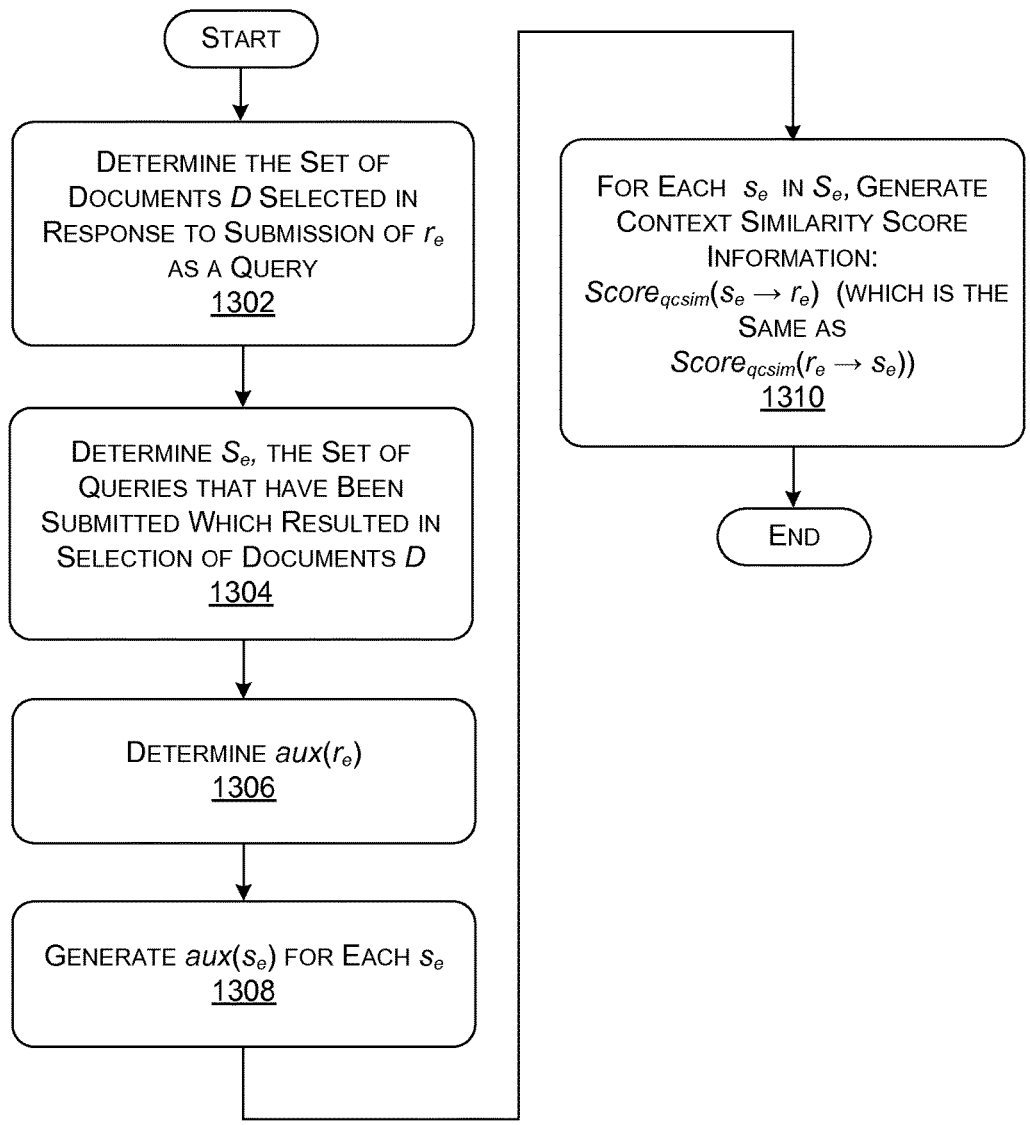
FIG. 13 is a flowchart that describes another process that the SGDSM can use to generate the synonym resources.

FIG. 13 shows a procedure 1300 that represents another technique that the SGDSM 602 can use to generate synonyms, for use in conjunction with the technique shown in FIG. 10. This subsection will explain the procedure 1300 with reference to the example shown in FIG. 14.

In block 1302, the SGDSM 602 generates a set of documents D that have been selected in response to submission of $r_e$ as a query. In block 1304, the SGDSM 602 determines $S_e$, the set of queries that have been submitted which have resulted in selection of the documents in D. These blocks correspond to the same initial operations performed in FIG. 10, explained with reference to FIGS. 11 and 12.

In block 1306, the SGDSM 602 determines auxiliary information aux($r_e$), which corresponds to words in queries which are nearby $r_e$. In block 1308, the SGDSM 602 determines auxiliary information aux($s_e$) for each $s_e$, which corresponds to words in queries which are nearby $s_e$.

Figure 14:
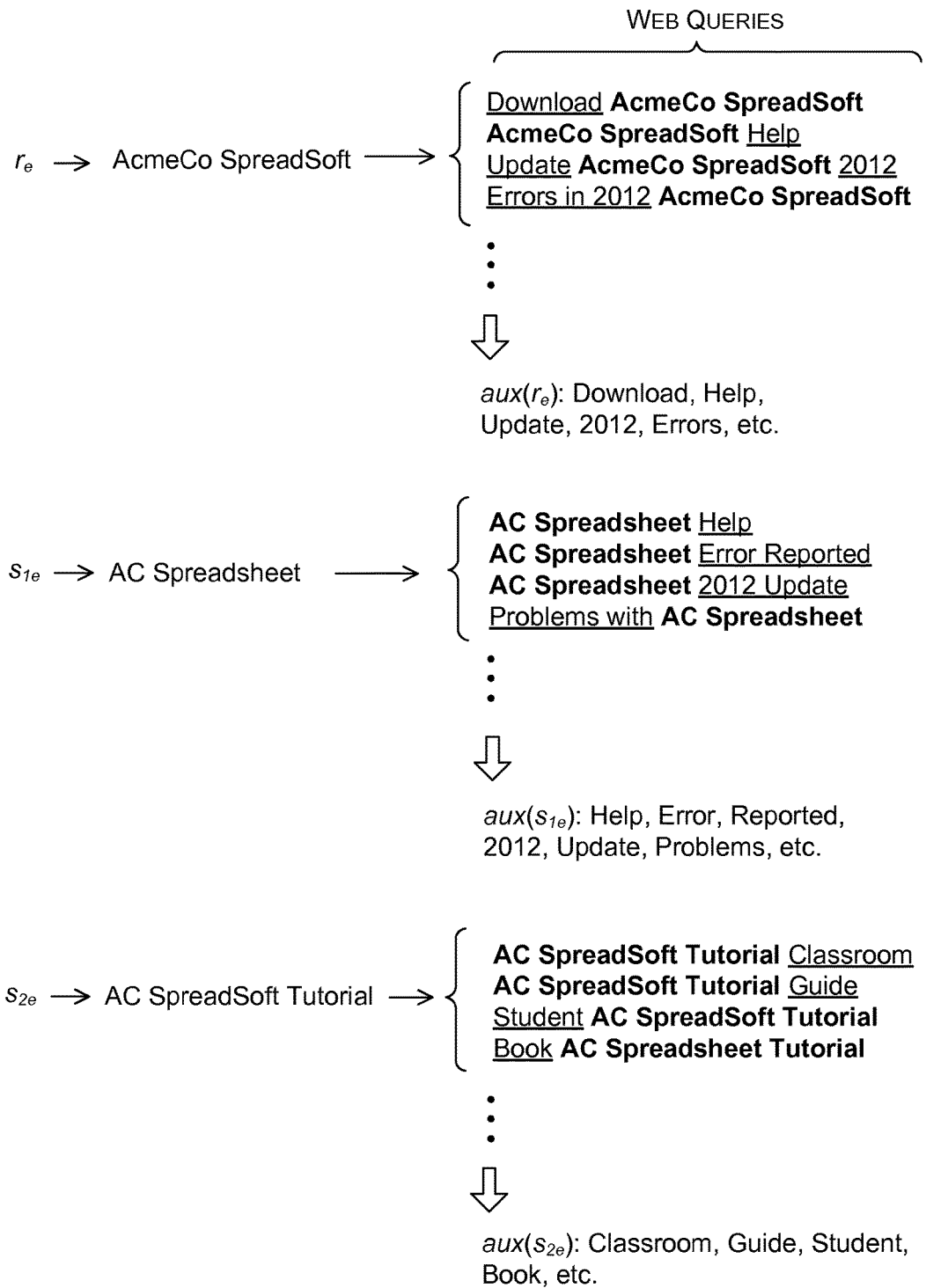
FIG. 14 shows an example for use in explaining the process of FIG. 13.

FIG. 14 provides an example which illustrates the meaning of aux($r_e$) and aux($s_e$) in the context of FIG. 13. Consider the case in which $r_e$ corresponds to the reference string "AcmeCo SpreadSoft," and two of the candidate strings correspond to "AC Spreadsheet" and "AC SpreadSoft Tutorial." The $r_e$ occurs in queries that also include the nearby words "Download," "Help," "Update," "2012," "Errors," etc. Thus, the aux($r_e$) contains these words. Further note that the first $s_e$, $s_{1e}$, includes auxiliary information aux($s_{1e}$) that includes the words "Help," "Error, "Reported," "2012," "Update," "Problems," etc. Some of the context words in aux($r_e$) overlap with the context words in aux($s_{1e}$). From this observation, it can be concluded that $r_e$ and $s_{1e}$ may pertain to the same topical class.

Returning to FIG. 13, in block 1310, the SGDSM 602 uses the information collected in the preceding blocks to determine Score$_{qcsim}$ information. More specifically, the SGDSM 602 can compute this score for a pair ($r_e$, $s_e$) as follows:

$$\text{Score}_{qcsim}(s_e \to r_e) = \text{Score}_{qcsim}(r_e \to s_e) = \frac{|aux(s_e) \cap aux(r_e)|}{|aux(s_e) \cup aux(r_e)|}.$$

In other words, the symmetrical Score$_{qcsim}$ information is proportional to the number of context words in aux($s_e$) that overlap with the context words in aux($r_e$), in relation to the total number of words in both aux($s_e$) and aux($r_e$).

In some cases, the SGDSM 602 can identify a final set of synonyms for $r_e$ based on a combination of the processing set forth in FIGS. 10 and 13. That is, the candidate strings which are true synonyms of $r_e$ meet threshold tests imposed by both the techniques of FIGS. 10 and 13.

In some implementations, the SGDSM 602 can perform all of the operations identified in FIGS. 10 and 13, supplying a pre-computed dictionary of $r_e$-to-$s_e$ mappings. That pre-computed dictionary constitutes the synonym resources (as that term is used in Section A). An enterprise application can consult this pre-computed dictionary to determine the synonym(s) for any specified term, if found in that dictionary.

In other implementations, the SGDSM 602 can perform part of the processing shown in FIGS. 10 and 13, such as by just generating the pseudo-documents (pdocs) and performing other preliminary computations. The intermediate results produced thereby constitute the synonym resources. The enterprise application can then instruct the SGDSM 602 to perform the remainder of the operations of FIGS. 10 and 13 with respect to one or more specified terms, to generate synonyms for those terms. Alternatively, the enterprise application can perform this remaining processing itself based on the intermediate results.

Other algorithms for generating synonyms are described in at least the following co-pending and commonly assigned applications: U.S. application Ser. No. 12/235,635, filed on Sep. 23, 2008, entitled "Generating Synonyms Based on Query Log Data," naming the inventors of Stelios Paparizos, et al.; U.S. Ser. No. 12/465,832, filed on May 14, 2009, entitled "Identifying Synonyms of Entities Using Web Search," naming the inventors of Surajit Chaudhuri, et al.; U.S. Ser. No. 12/478,120, filed on Jun. 4, 2009, entitled "Identifying Synonyms of Entities Using a Document Collection," naming the inventors of Surajit Chaudhuri, et al.; and U.S. Ser. No. 13/487,260, filed on Jun. 4, 2012, entitled "Robust Discovery of Entity Synonyms Using Query Logs," naming the inventors of Tao Cheng, et al. Each of these applications is incorporated herein by reference in its entirety. Any of the algorithms described in these applications can be used to implement aspects of the SGDSM 602.

B.2. Generating Augmentation Resources

Figure 15:
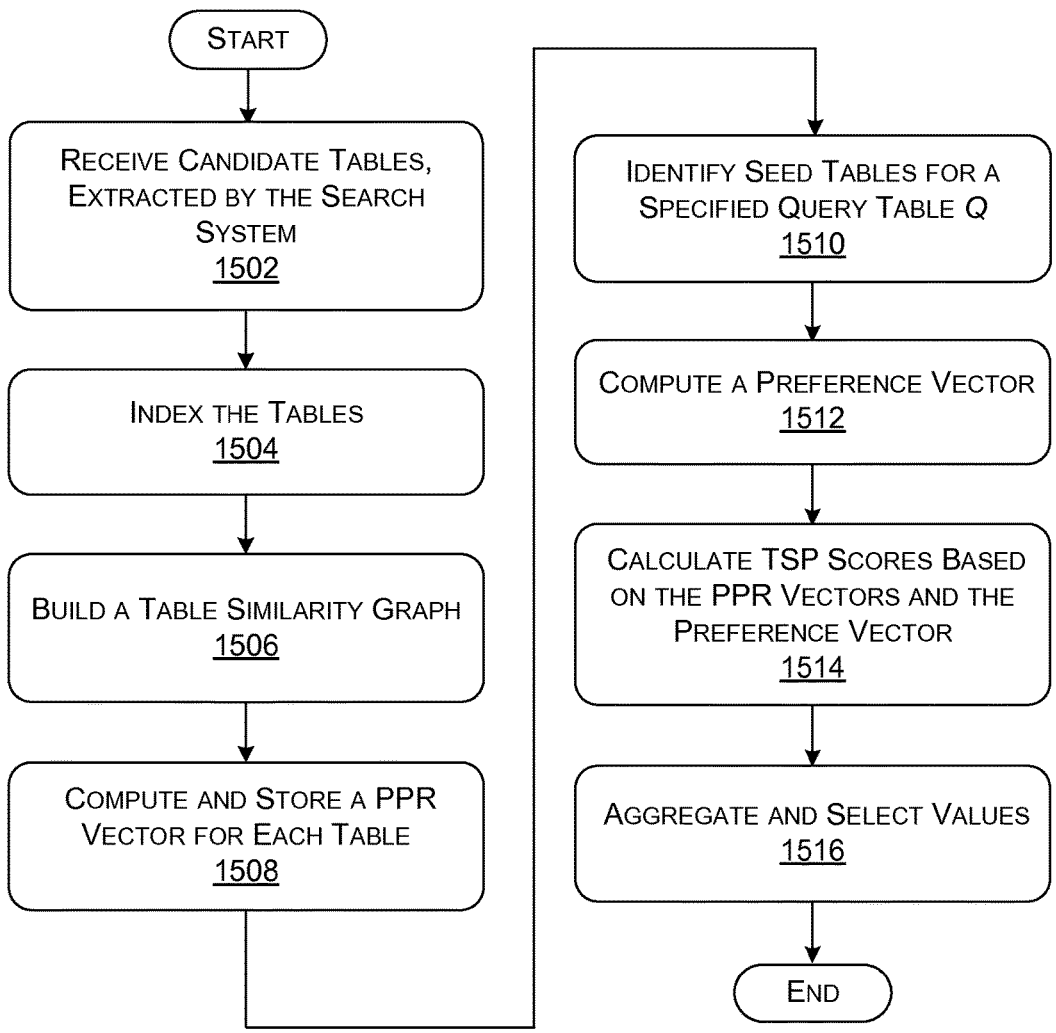
FIG. 15 is a flowchart that describes a process that the ADSM can use to generate the augmentation resources.

FIG. 15 shows a procedure 1500 that the augmentation data service module (ADSM) 604 can use to generate the augmentation resources. This subsection will explain the procedure 1500 with reference to illustrative example of FIG. 16. That is, in the case shown in FIG. 16, the user specifies seed information that corresponds to a query table Q. The query table Q includes a first column that lists attribute values associated with an attribute heading name "Model," (e.g., including the attribute values "S70," "A15," "BX-3x," etc.). But the query table Q includes a second column, associated with the attribute heading name "Brand," that omits its attribute values. An enterprise application can leverage the augmentation resources provided by the ADSM 604 to supply the attribute values in the second column. In this context, the attribute values in the first column correspond to keys in the augmentation process.

In block 1502, the ADSM 604 receives candidate tables from the search system 108. For example, the search system 108 identifies the candidate tables by "crawling" a wide area network (such as the Internet) to identify table-like resources pertaining to entities. The search system 108 can use any technique to perform this task. For example, the search system 108 can feed features associated with web content into a trained classifier. The classifier can process the features to pick out tables that pertain to entities.

In block 1502, the ADSM 604 can generate one or more indexes for the candidate tables. These indexes provide an efficient mechanism for comparing characteristics of a query table Q with each candidate table.

In block 1504, the ADSM 604 builds a directed table similarity graph. The table similarity graph includes a set of nodes V associated with the respective candidate tables. The table similarity graph also includes a set of edges E that connect the candidate tables together. Each edge, connecting a particular source node u to a particular target node v, is associated with a similarity weight $\alpha_{u,v}$. That weight reflects the degree of similarity between the two candidate tables associated with the nodes u and v, respectively.

The ADSM 604 can use any technique to derive the edge weights. For example, the ADSM 604 can use a schema-matching technique to compare any first candidate table with a second candidate table, corresponding to two nodes in the table similarity graph. More specifically, the ADSM 604 can identify a collection of features which characterize the similarity (and dissimilarity) between the first candidate table and the second candidate table. The ADSM 604 can then feed the features into a trained classifier. The classifier can process the features to generate a score which reflects the overall similarity of the first candidate table to the second candidate table. Without limitation, the ADSM 604 can leverage any characteristics of the candidate tables in defining the features, such as: attributes values, attribute heading names, etc. within a candidate table itself; the context associated with the candidate table (corresponding to the words in a page in which the candidate table appears); the URL associated with the page in which the candidate table appears; the size of the candidate table, and so on.

In block 1506, the ADSM 604 computes and stores a Personalized PageRank (PPR) vector for each candidate table. More formally stated, the PRR vector of a node v, with respect to a source node u, denoted by $\pi_u(v)$, is defined as the solution to the following equation:

$$\pi_u(v) = \epsilon \delta_u(v) + (1-\epsilon) \sum_{\{w|(w,v) \in E\}} \pi_u(w) \alpha_{w,v}.$$

In this equation, $\alpha_{w,v}$ represents the weight on a particular edge in the table similarity graph between nodes w and v, $\delta_u(v)=1$ iff u=v, and 0 otherwise, and E refers to a defined probability value (e.g., the teleport probability). The set of PPR values $\pi_u(v)$ for all nodes v with respect to node u is referred to as the PPR vector of node u. The ADSM 604 can use any technique to generate the PPR vectors, such as the MapReduce technique, the Power Iteration technique, etc.

Figure 16:
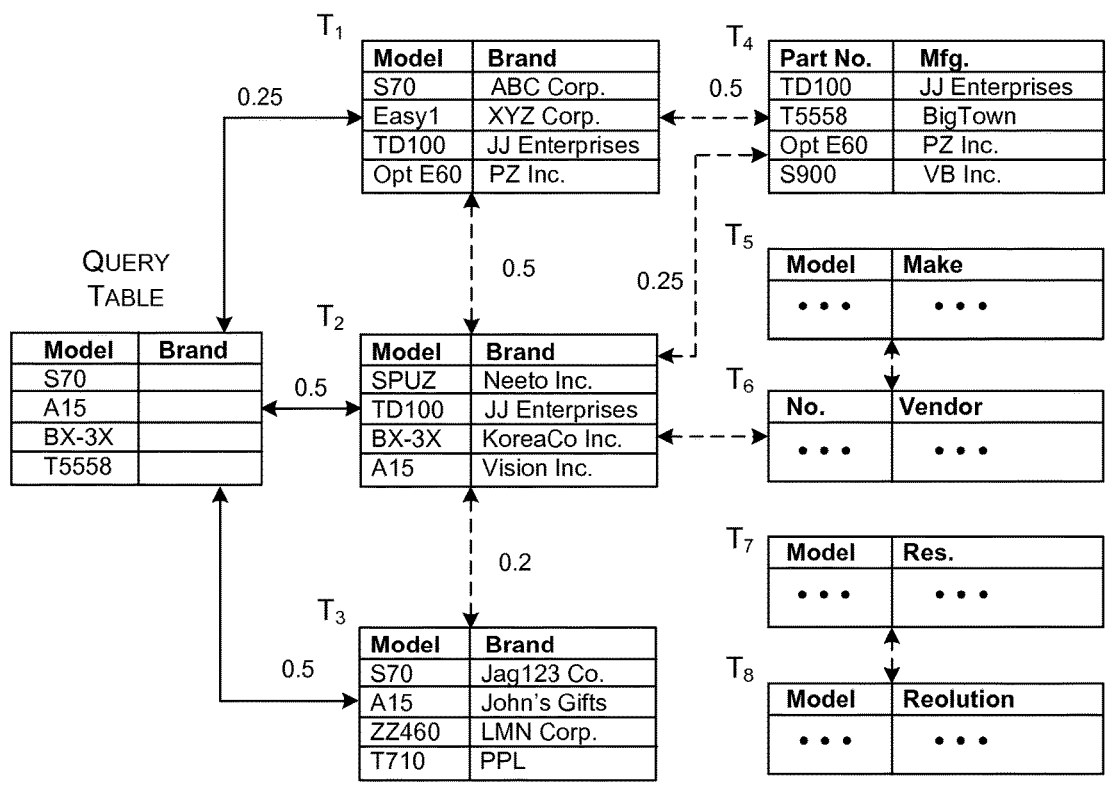
FIG. 16 shows an example for use in explaining the process of FIG. 15.

In block 1510, the ADSM 604 computes seed tables associated with the query table Q. With respect to the example of FIG. 16, a seed table is any candidate table that has: (1) at least one attribute value in its first column that agrees with an attribute value in the first column of the query table Q; and (2) an attribute heading name for its second column that agrees with the attribute heading name of the query table's second column. For example, table $T_1$ is a seed table because it includes the attribute value "S70," which also appears in the query table Q; it also includes the same attribute heading name ("Brand") as the query table Q. FIG. 16 shows a total of three such seed tables (i.e., $T_1$, $T_2$, and $T_3$).

The ADSM 604 also computes a direct matching score $S_{DMA}(T)$ for each seed table. This score is computed by determining the number of attribute values in the first column of the query table Q which are also found in the first column of the seed table. The ADSM 604 then divides this number by the number of attribute values that are found in either the query table Q or the seed table, whatever is smaller. For example, the table $T_1$ has a $S_{DMA}$ score of 0.25 because it has one match with the query table Q, and this match is divided by 4 (the number of entries in the table $T_1$).

In block 1512, the ADSM 604 computes a preference vector $\vec{\beta}$. Each element of the preference vector $\vec{\beta}$ corresponds to a particular candidate table in the table similarity graph, but only elements corresponding to the seed tables have non-zero values. In one implementation, the preference value $\beta_v$ for a particular seed table corresponds to its $S_{DMA}$ score, divided the sum of the $S_{DMA}$ scores for all the seed tables. For example, the preference value $\beta_v$ for the table $T_1$ is 0.25/1.25.

In block 1514, the ADSM 604 computes Topic-Sensitive PageRank (TSP) scores based on the PPR vectors (provided in block 1508) and the preference vector $\vec{\beta}$ (provided in block 1512). In one approach, the TSP of a node v (corresponding to a particular candidate table in the graph), for a preference vector $\vec{\beta}$, can be computed based on:

$$\pi_{\vec{\beta}}(v) = \sum_{u \in V} \beta_u \times \pi_u(v).$$

The ADSM 604 uses the TSP scores of the candidate tables to pick out the tables that are considered sufficiently similar to the query table Q. That is, the ADSM 604 can identify a candidate table as relevant if its TSP score is above a prescribed threshold. The output of block 1504 is a set of relevant candidate tables.

Note that the above-described technique can even identify candidate tables that are indirectly related to the query table Q. For example, with reference to FIG. 16, the ADSM 604 can assign a relatively high TSP score to the table $T_4$, even though $T_4$ is not directly related to the query table Q. In other words, the table $T_4$ is not itself a seed table. The ADSM 604 can identify indirect matches in this manner by virtue of its inclusion of PPR vectors into its analysis. The PPR value $\pi_u(v)$ of a particular node v with respect to u considers all the paths, direct as well as indirect, from u to v and "aggregates" their scores to compute the overall score.

In block 1516, the ADSM 604 can analyze the relevant candidate tables (identified in block 1514) to determine the missing attribute values in the query table Q, such as the missing attribute values in the "Brand" column of the query table Q. One such technique will be described below with reference to the attribute value "S70," which appears in the first column of the query table Q. To estimate the brand attribute value for this entry, the ADSM 604 first identifies relevant candidate tables which include the attribute value "S70," and which also list a corresponding brand attribute value for this entry. For instance, table $T_1$ identifies the brand attribute value for "S70" as "ABC Corp.," while $T_3$ identifies the brand attribute value for "S70" as "Jag123 Co." Overall, this operation identifies a set of matching branch attribute values and associated scores. The score of each attribute value corresponds to the $S_{DMA}$ score of the table with which it is associated; that is, for instance, the score of the attribute value "ABC Corp." corresponds to the $S_{DMA}$ score associated with table $T_1$.

Next, the ADSM 604 can use any fuzzy matching technique to group the entries in the set of matching attribute values into one or more groups. The ADSM 604 can then pick a representative attribute value for each group, e.g., corresponding to the centroid of the group. The score associated with a representative attribute value corresponds to any kind of aggregation of the scores associated with other members of its group. Finally, the ADSM 604 can pick the representative attribute value having the highest score. In the simple case of FIG. 16, for the attribute value "S70" under consideration, the ADSM 604 identifies two groups, having one member each. The ADSM 604 picks the attribute value "Jag123 Co." for inclusion in the query table Q because it has a higher score compared to "ABC Corp."

In some implementations, the ADSM 604 can perform all of the operations identified in FIG. 15, supplying a pre-computed mapping table which identifies supplemental information corresponding to a plurality of instances of seed information. That pre-computed mapping table constitutes the aggregation resources. An enterprise application can consult this pre-computed mapping table to determine the supplemental information for any specified seed information, if that seed information is found in the mapping table.

In other implementations, the ADSM 604 can perform part of the processing shown in FIG. 15, such as by just generating the PPR vectors for a set of candidate tables. The intermediate results produced thereby constitute the aggregation resources. The enterprise application can then instruct the ADSM 604 to perform the remainder of the operations of FIG. 15 with respect to specified seed information (e.g., a particular query table Q), to generate supplemental information for the seed information. Alternatively, or in addition, the enterprise application can perform this remaining processing itself based on the intermediate results.

Other algorithms for generating supplemental information by mining Internet data assets are described in at least the following co-pending and commonly assigned application: U.S. application Ser. No. 13/413,179, filed on Mar. 6, 2012, entitled "Entity Augmentation Service from Latent Relational Data," naming the inventors of Kris K. Ganjam, et al. This application is incorporated by reference herein in its entirety. The algorithms described therein can be used to implement aspects of the ADSM 604.

B.3. Generating Spelling-Correction Resources

Figure 17:
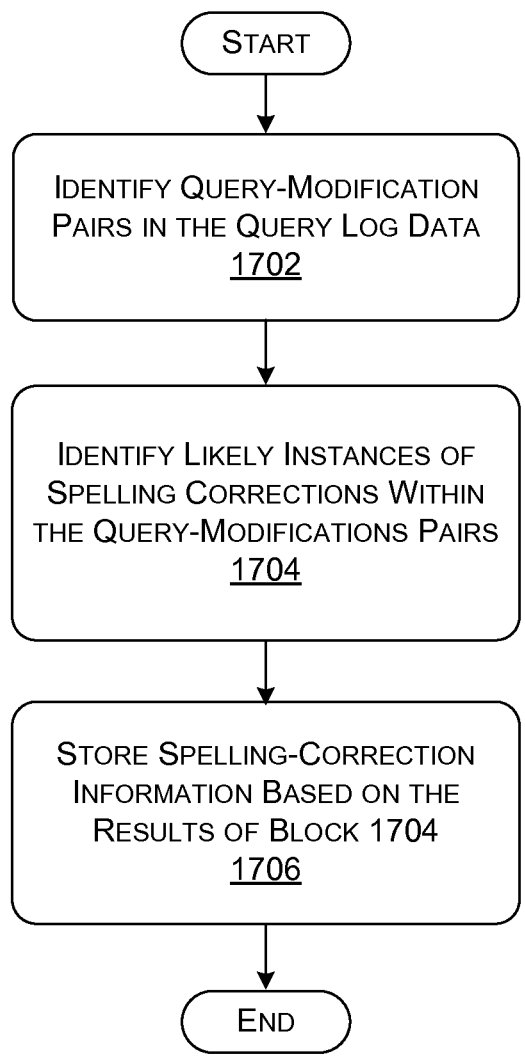
FIG. 17 is a flowchart that describes a process that the SIDSM can use to generate the spelling-correction resources.

FIG. 17 shows a procedure 1700 that the spelling information data service module (SIDSM) 606 can use to generate the spelling-correction resources. This subsection describes this procedure 1700 with reference to the example of FIG. 18.

In block 1702, the SIDSM 606 identifies query-modification pairs in query log data. Each query-modification pair represents an original query submitted by a user, followed by a modification of that original query.

More specifically, the query-modification pairs may include at least two classes of query reformulations. A first class corresponds to two queries manually submitted by a user. That is, the user may have entered a first query that includes a misspelled term. The search system 108 may alert the user to the misspelling by providing poor search results, and/or by proposing a correctly-spelled counterpart to the user's first query. In response to these prompts, the user may submit a second query which corrects the spelling error in the first query. The SIDSM 606 can designate a particular pair of queries as a potential reformulation pairing by determining whether the textual similarity between the first query and the second query satisfies a prescribed threshold. In some instances, the second query immediately follows the first query, but it need not.

The search system 108 may also apply algorithms to automatically correct a user's misspelled query. Thus, for a second class of query-modification pairs, the user again manually inputs his or her first query; but the second query corresponds to an automated reformulation of the first query that is performed by the search system 108. The user may or may not be aware of this reformulation.

Figure 18:
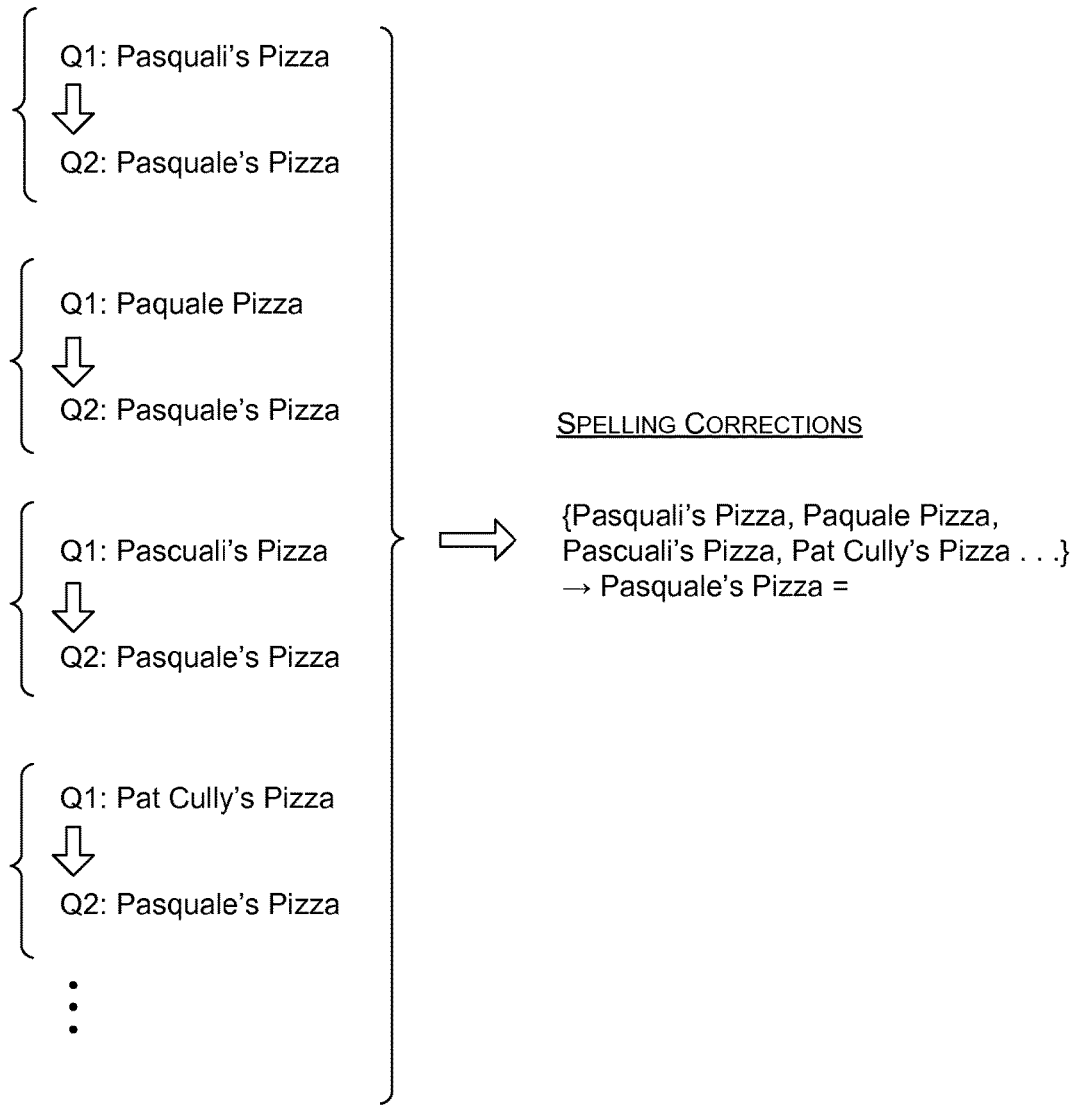
FIG. 18 shows an example for use in explaining the process of FIG. 17.

FIG. 18 shows a series of query-modification pairs. In each case, the user inputs a query with the intent of describing a particular restaurant, Pasquale's Pizza. But, in each case, the user has misspelled the restaurant's name. In some cases, the second member of the pairing corresponds to a manual reformulation performed by the user. In other cases, the second member corresponds to an automated reformulation performed by the search system 108.

In block 1704, the SIDSM 606 can use any appropriate technique to pick out instances of valid spelling corrections within the query-modification pairs. For example, the SIDSM 606 can employ a trained classifier to perform this task. That classifier can accept features which characterize each member of a query-modification pair, as well as differences between the members. The classifier can also take into account the frequency at which a particular query-modification pair occurs in the query log data (where a query-modification pair having a high frequency is more likely to correspond to a valid spelling correction.) This operation yields a spelling correction dictionary. That is, each entry of the spelling correction dictionary maps a presumably misspelled term to its corrected counterpart.

In block 1706, the SIDSM 606 can store the spelling correction dictionary provided in block 1704. In some cases, this spelling correction dictionary constitutes the spelling-correction resources described in Section A. Alternatively, or in addition, an enterprise application can access and utilize any of the intermediate results produced by the SIDSM 606; these too can be considered spelling-correction resources for consumption by the enterprise application.

C. Representative Computing Functionality

FIG. 19 sets forth illustrative computing functionality 1900 that can be used to implement any aspect of the functions described above. For example, the type of computing functionality 1900 shown in FIG. 19 can be used to implement any aspect of the search systems 102 (or, more generally, any aspect of the network-accessible systems), any aspect of the data service system 104, and any aspect of the enterprise environments 106. In one case, the computing functionality 1900 may correspond to any type of computing device that includes one or more processing devices. In all cases, the computing functionality 1900 represents one or more physical and tangible processing mechanisms.

The computing functionality 1900 can include volatile and non-volatile memory, such as RAM 1902 and ROM 1904, as well as one or more processing devices 1906 (e.g., one or more CPUs, and/or one or more GPUs, etc.). The computing functionality 1900 also optionally includes various media devices 1908, such as a hard disk module, an optical disk module, and so forth. The computing functionality 1900 can perform various operations identified above when the processing device(s) 1906 executes instructions that are maintained by memory (e.g., RAM 1902, ROM 1904, or elsewhere).

More generally, instructions and other information can be stored on any computer readable medium 1910, including, but not limited to, static memory storage devices, magnetic storage devices, optical storage devices, and so on. The term computer readable medium also encompasses plural storage devices. In all cases, the computer readable medium 1910 represents some form of physical and tangible entity.

The computing functionality 1900 also includes an input/output module 1912 for receiving various inputs (via input modules 1914), and for providing various outputs (via output modules). One particular output mechanism may include a presentation module 1916 and an associated graphical user interface (GUI) 1918. The computing functionality 1900 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area network, a wide area network (e.g., the Internet), etc., or any combination thereof. The communication conduit(s) 1922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a hardware computing device, the method comprising:
   receiving system data assets comprising system data asset tables from a network-accessible system, the network-accessible system being configured to provide a service to a population of end-users via a wide area network;
   processing the system data asset tables of the system data assets to provide processed data assets comprising augmentation resources; and
   providing access to the processed data assets to an enterprise application,
   the augmentation resources supplementing an enterprise data table of the enterprise application by providing, from the system data asset tables, an attribute value to the enterprise application that is lacking in the enterprise data table,
   wherein the processing the system data asset tables comprises:
      identifying, in a column of the enterprise data table, a name for the attribute value that is lacking in the enterprise data table;
      identifying another attribute value for another attribute in another column of the enterprise data table;
      identifying a matching system data asset table that shares the another attribute and has a corresponding attribute value for the another attribute that agrees with the another attribute value from the enterprise data table; and
      obtaining the attribute value that is lacking in the enterprise data table from the matching system data asset table.

2. The method of claim 1, further comprising:
   crawling the wide area network to identify the system data asset tables, the system data asset tables being external resources relative to the enterprise application, the enterprise data table being an internal resource of the enterprise application.

3. The method of claim 2, wherein the attribute value is obtained from another column of the matching system data asset table that shares the name with the column of the enterprise data table.

4. The method of claim 1, wherein the augmentation resources comprise a pre-computed mapping table.

5. The method of claim 1, wherein the network-accessible system comprises an Internet search engine and the enterprise application is not associated with the Internet search engine.

6. The method of claim 1, wherein the augmentation resources characterize relative similarity of the system data asset tables to the enterprise data table.

7. The method of claim 1, wherein the processed data assets comprise intermediate results, and wherein said providing comprises:
   performing additional processing based on the processed data assets, in conjunction with input received from the enterprise application, to provide final results; and
   providing the final results to the enterprise application.

8. The method of claim 1, wherein said providing comprises delivering at least part of the processed data assets to the enterprise application in an offline manner.

9. The method of claim 1, wherein said providing comprises providing access to the processed data assets in an online manner in response to a request by the enterprise application to perform at least one function.

10. The method of claim 1, wherein said providing comprises providing access to the processed data assets contingent upon existence of a valid subscription which authorizes use of the processed data assets by the enterprise application.

11. A computing system comprising:
    a hardware processing device; and
    a hardware computer readable storage medium storing computer readable instructions that, when executed by the hardware processing device, cause the hardware processing device to:
    store a native spelling correction dictionary of an enterprise application;
    obtain spelling correction resources provided by a data service system, the spelling correction resources reflecting query reformulations submitted by users to a network-accessible system that is separate from the enterprise application, the network-accessible system being configured to provide a service to a population of end-users via a wide area network; and
    perform a spelling correction function by the enterprise application, the spelling correction function being performed in first instances using the native spelling correction dictionary of the enterprise application and in second instances using the spelling correction resources provided by the data service system,
    wherein the spelling correction function involves, in at least one of the second instances, automatically correcting a misspelled word in the enterprise application by:
       identifying an individual query reformulation performed by an individual user of the network-accessible system independently of the enterprise application, the individual query reformulation identifying the misspelled word in a first query that is subsequently corrected to a proper spelling in a second query; and
       automatically substituting the proper spelling for the misspelled word in the enterprise application.

12. The computing system of claim 11, wherein the spelling correction resources used to perform the spelling correction function by the enterprise application include manual query reformulations performed by the users when using the network-accessible system independently of the enterprise application.

13. The computing system of claim 11, wherein the network-accessible system comprises a commercial web search engine separate from the enterprise application, and the spelling correction resources used to perform the spelling correction function by the enterprise application include automatic query reformulations performed by the commercial web search engine independently of the enterprise application.

14. The computing system of claim 13, wherein the native spelling correction dictionary uses an edit distance algorithm to perform the spelling correction function.

15. The computing system of claim 14, wherein the enterprise application comprises a text processor.

16. The computing system of claim 11, wherein the network-accessible system is configured to provide an Internet search service.

17. The computing system of claim 16, wherein the computer readable instructions, when executed by the hardware processing device, cause the hardware processing device to:

identify the individual query reformulation based at least on textual similarity between the first query and the second query.

18. A system comprising:

a hardware processing device; and a hardware computer readable storage medium storing computer readable instructions that, when executed by the hardware processing device, cause the hardware processing device to:

receive system data assets from an Internet search engine, the Internet search engine being configured to provide an Internet search service to a population of end-users via the Internet;

obtain a specified term used in executing a consuming enterprise application independently of the Internet search engine;

generate synonym resources based at least on the system data assets received from the Internet search engine, the synonym resources being generated by identifying, from the system data assets, another term that users of the Internet search engine used synonymously with the specified term when interacting with the Internet search engine independently of the consuming enterprise application; and provide the synonym resources to the consuming enterprise application, the synonym resources enabling the consuming enterprise application to provide individual synonyms for individual terms, the synonym resources indicating that the another term used by the users of the Internet search engine is a synonym of the specified term used in executing the consuming enterprise application, wherein the consuming enterprise application is not part of the Internet search engine, and wherein the system data assets reflect instances where users of the Internet search engine used synonyms of the specified terms to query the Internet search engine.

19. The system of claim 18, wherein the computer readable instructions, when executed by the hardware processing device, cause the hardware processing device to:

pre-compute a dictionary of synonymous terms from the system data assets, the synonym resources comprising the pre-computed dictionary.

20. The system of claim 18, wherein the computer readable instructions, when executed by the hardware processing device, cause the hardware processing device to:

use the individual synonyms to search a local database of the consuming enterprise application; and add other individual synonyms to a table in the local database.

* * * * *